(12) United States Patent
Wetsch et al.

(10) Patent No.: US 10,259,186 B2
(45) Date of Patent: Apr. 16, 2019

(54) RECIPE CONTROLLED PROCESS FOR MAKING PACKAGING MATERIALS

(71) Applicant: Pregis Innovative Packaging LLC, Deerfield, IL (US)

(72) Inventors: Thomas D. Wetsch, St. Charles, IL (US); Keith Maranto, Frankfort, IL (US)

(73) Assignee: PREGIS INNOVATIVE PACKAGING LLC, Deerfield, IL (US)

( * ) Notice: Subject to any disclaimer, the term of this patent is extended or adjusted under 35 U.S.C. 154(b) by 712 days.

(21) Appl. No.: 14/630,586

(22) Filed: Feb. 24, 2015

(65) Prior Publication Data

US 2015/0239195 A1 Aug. 27, 2015

Related U.S. Application Data

(60) Provisional application No. 61/944,026, filed on Feb. 24, 2014.

(51) Int. Cl.
*B31D 5/00* (2017.01)
*G05B 15/02* (2006.01)

(52) U.S. Cl.
CPC ........... *B31D 5/0073* (2013.01); *G05B 15/02* (2013.01); *B31D 2205/0023* (2013.01); *B31D 2205/0047* (2013.01); *B31D 2205/0088* (2013.01)

(58) Field of Classification Search
CPC .... B31D 5/00; B31D 5/0073; B31D 2205/00; B31D 2205/0005; B31D 2205/0011;
(Continued)

(56) References Cited

U.S. PATENT DOCUMENTS

| | | | |
|---|---|---|---|
| 6,117,058 A * | 9/2000 | Sauder .................... | B31B 70/00 493/193 |
| 6,799,619 B2 * | 10/2004 | Holmes ................ | B23K 26/032 156/358 |

(Continued)

FOREIGN PATENT DOCUMENTS

| | | |
|---|---|---|
| CN | 101080315 A | 11/2007 |
| CN | 101489874 A | 7/2009 |

(Continued)

OTHER PUBLICATIONS

Extended European Search Report dated Nov. 2, 2017, in European Application No. 15751286.4, 7 pages.
(Continued)

*Primary Examiner* — Gloria R Weeks
(74) *Attorney, Agent, or Firm* — Dorsey & Whitney LLP

(57) ABSTRACT

The present disclosure relates generally to an inflation and sealing machine and in particular to a method for modifying one or more parameters of the machine. The method includes identifying a configuration of a supply material to be used with the inflation and sealing machine, such as by receiving a user input, automatically detecting characteristics of the material, and/or receiving data such as from a sensor regarding the characteristics of the material. Once the configuration of the supply material is identified, the method includes receiving a selection of a prestored recipe according to a configuration of the supply material, where the recipe determines or sets the value for one or more operating parameters of the machine.

14 Claims, 16 Drawing Sheets

(58) Field of Classification Search
CPC .... B31D 2205/0047; B31D 2205/0076; B31D 2205/0088; B29C 66/00; B29C 66/90; B29C 66/91; B29C 66/92; B29C 66/93; B29C 66/914; B29C 66/924; B29C 66/934
USPC .......... 53/403, 79, 85, 111 R, 407, 428, 432, 53/433, 434, 510, 511, 512
See application file for complete search history.

(56) References Cited

U.S. PATENT DOCUMENTS

| | | | | |
|---|---|---|---|---|
| 7,077,183 | B2* | 7/2006 | Normandin | B29C 66/45 156/359 |
| 7,089,714 | B2* | 8/2006 | Thomas | B31D 5/0073 53/374.8 |
| 7,121,457 | B2* | 10/2006 | Michal | G05B 19/128 235/375 |
| 7,913,474 | B2* | 3/2011 | Aquarius | B31D 5/0073 493/314 |
| 7,950,433 | B2* | 5/2011 | Sperry | B31D 5/0073 156/361 |
| 8,061,110 | B2* | 11/2011 | Wetsch | B31D 5/0073 53/403 |
| 8,360,946 | B2* | 1/2013 | Giro Amigo | B65H 26/00 343/767 |
| 8,402,719 | B2* | 3/2013 | Birkle | B31D 5/0073 493/967 |
| 8,585,950 | B2* | 11/2013 | Appling | A61M 25/0009 264/248 |
| 8,635,836 | B2* | 1/2014 | Tan | B31D 5/0073 493/967 |
| 8,695,311 | B2* | 4/2014 | Daigle | B29C 65/18 53/64 |
| 8,777,089 | B2* | 7/2014 | Beech | B23K 20/121 228/112.1 |
| 8,800,247 | B2* | 8/2014 | Van Uijen | B29C 65/18 53/64 |
| 9,021,771 | B2* | 5/2015 | Liu | B65B 31/048 53/370.7 |
| 9,168,715 | B2* | 10/2015 | Wetsch | B31D 5/0073 |
| 9,266,300 | B2* | 2/2016 | Chuba | B31D 5/0073 |
| 9,381,715 | B2* | 7/2016 | Birkle | B31D 5/0073 |
| 2005/0143242 | A1 | 6/2005 | Sauder et al. | |
| 2006/0084559 | A1 | 4/2006 | Selle et al. | |
| 2007/0181258 | A1 | 8/2007 | Robinson et al. | |
| 2007/0251190 | A1 | 11/2007 | Daigle et al. | |
| 2008/0119340 | A1 | 5/2008 | Selle et al. | |
| 2009/0094939 | A1* | 4/2009 | Wetsch | B31D 5/0073 53/79 |
| 2010/0050571 | A1 | 3/2010 | Birkle et al. | |
| 2011/0172072 | A1* | 7/2011 | Wetsch | B31D 5/0073 493/227 |
| 2012/0110954 | A1* | 5/2012 | Brumback | B07C 5/00 53/428 |
| 2013/0011510 | A1* | 1/2013 | Chuba | B31D 5/0073 425/324.1 |
| 2013/0205717 | A1* | 8/2013 | Bowden | B65B 31/04 53/403 |
| 2014/0216648 | A1* | 8/2014 | Geiger | B29C 65/1635 156/272.8 |
| 2014/0261752 | A1* | 9/2014 | Wetsch | B65B 41/16 137/223 |
| 2015/0375469 | A1* | 12/2015 | Wetsch | B65B 3/04 493/1 |
| 2015/0375882 | A1* | 12/2015 | Wetsch | B65B 3/04 53/284.7 |
| 2015/0378352 | A1* | 12/2015 | Wetsch | B65B 3/04 700/97 |
| 2015/0378750 | A1* | 12/2015 | Wetsch | B65B 3/04 715/709 |
| 2015/0379462 | A1* | 12/2015 | Wetsch | B65B 3/04 705/28 |
| 2016/0151987 | A1* | 6/2016 | Chuba | B31D 5/0073 156/147 |

FOREIGN PATENT DOCUMENTS

| | | |
|---|---|---|
| EP | 0884171 B1 | 4/2003 |
| JP | H10505291 A | 5/1998 |
| WO | 2013/006779 A1 | 1/2013 |

OTHER PUBLICATIONS

International Preliminary Report on Patentability dated May 27, 2016, in PCT Application No. PCT/US2015/017390, 4 pages.
English translation of Search Report dated Apr. 6, 2017, in Chinese Application No. 201580016789.2, 2 pages.
United States Patent and Trademark Office, Written Opinion for International Application No. PCT/US2015/017390 dated May 22, 2015, 6 pages.
United States Patent and Trademark Office, International Search Report for International Application No. PCT/US2015/017390 dated May 22, 2015, 2 pages.
Written Opinion for International Patent Application No. PCT/US2015/017390, dated May 22, 2015 (6 pages).
International Search Report for International Patent Application No. PCT/US2015/017390, dated May 22, 2015 (2 pages).

* cited by examiner

RECIPE CONTROLLED PROCESS FOR MAKING PACKAGING MATERIALS

CROSS REFERENCE

This application claims the benefit of priority pursuant to 35 U.S. C. § 119(e) to U.S. provisional application No. 61/944,026 filed Feb. 24, 2015 entitled "Recipe Controlled Device for Making Packaging Materials," which is hereby incorporated by reference herein in its entirety.

TECHNICAL FIELD

The present disclosure is directed to devices and methods for manufacturing inflatable cushions to be used as packaging material.

BACKGROUND

A variety of inflated cushions are well-known and used for sundry packaging applications. For example, inflated cushions are often used as void-fill packaging in a manner similar to or in place of foam peanuts, crumpled paper, and similar products. Also for example, inflated cushions are often used as protective packaging in place of molded or extruded packaging components.

Generally, inflated cushions are formed from films having two layers that are joined together by seals. The seals can be formed simultaneously with inflation, so as to capture air therein, or prior to inflation to define a film configuration having inflatable chambers. The inflatable chambers can be inflated with air or another gas or thereafter sealed to inhibit or prevent release of the air or gas.

Such film configurations can be stored in rolls or fan-folded boxes in which adjacent inflatable cushions are separated from each other by perforations. During use, a film configuration is inflated to form cushions and adjacent cushions or adjacent stands of cushions are separated from each other along the perforations.

A variety of film configurations are currently available. Many of these film configurations include seal configurations that tend to waste material, inhibit separation of adjacent inflated cushions, and/or form inflated cushions that are susceptible to under-inflation or leakage, thereby inhibiting utility.

The films are typically inflated by being pulled from a bulk quantity of the film and passed over or proximal to a nozzle. The nozzle blows air in between the films forming cushions. Heat is then used to bind two layers of the film together forming a seal which limits air from escaping. Frequently the films are poorly aligned or have too much freedom (e.g. slack) to be efficiently delivered to the nozzle for inflation. Additionally, due to the heat and pressures used in the process, the films may stick to machine surfaces or the film layers may be pulled apart while still hot and exiting the mechanism.

SUMMARY

In one embodiment, the present disclosure relates generally to an inflation and sealing machine and in particular to a method for modifying one or more parameters of the machine. The method includes identifying a configuration of a supply material to be used with the inflation and sealing machine, such as by receiving a user input, automatically detecting characteristics of the material, and/or receiving data such as from a sensor regarding the characteristics of the material. Once the configuration of the supply material is identified, the method includes receiving a selection of a prestored recipe according to a configuration of the supply material, where the recipe determines or sets the value for one or more operating parameters of the machine.

In another embodiment, the present disclosure relates generally to a method for modifying one or more parameters of an inflation and sealing assembly. The method includes selecting a predetermined recipe from a plurality of recipes and configuring the inflation and sealing assembly to operate based on the predetermined recipe. The predetermined recipe includes settings for a plurality of components of the inflation and sealing assembly.

In yet another embodiment, the present disclosure generally relates to a method for modifying one or more parameters of a machine. The method includes modifying a first parameter based on at least one of a material, a material size, a desired inflation rate, and inflation pocket geometry, or a feed speed, analyzing a second parameter to determine if the second parameter is functionally related to the first parameter, and if the second parameter is functionally related to the first parameter, adjusting the second parameter to correspond to the modification to the first parameter and if the second parameter if not functionally related to the first parameter, not adjusting the second parameter.

In another embodiment, the present disclosure relates to a method for creating packaging materials. The method includes selecting at least one material parameter of a packaging material, determining a setting for a first machine parameter based on the at least one material parameter, adjusting the first machine parameter based on the setting, determining if a second machine parameter should be adjusted based on the setting for the first machine parameter, and adjusting the second machine parameter based on the determination.

In still another embodiment, the present disclosure relates to an inflation and sealing assembly. The assembly includes a spindle for receiving a supply of material, a brake machine operably connected to the spindle that selectively applies a frictional force to the supply of material, and a control system in communication with the brake mechanism, where the control system selectively varies the frictional force applied by the brake mechanism.

DETAILED DESCRIPTION

Figure 1A:
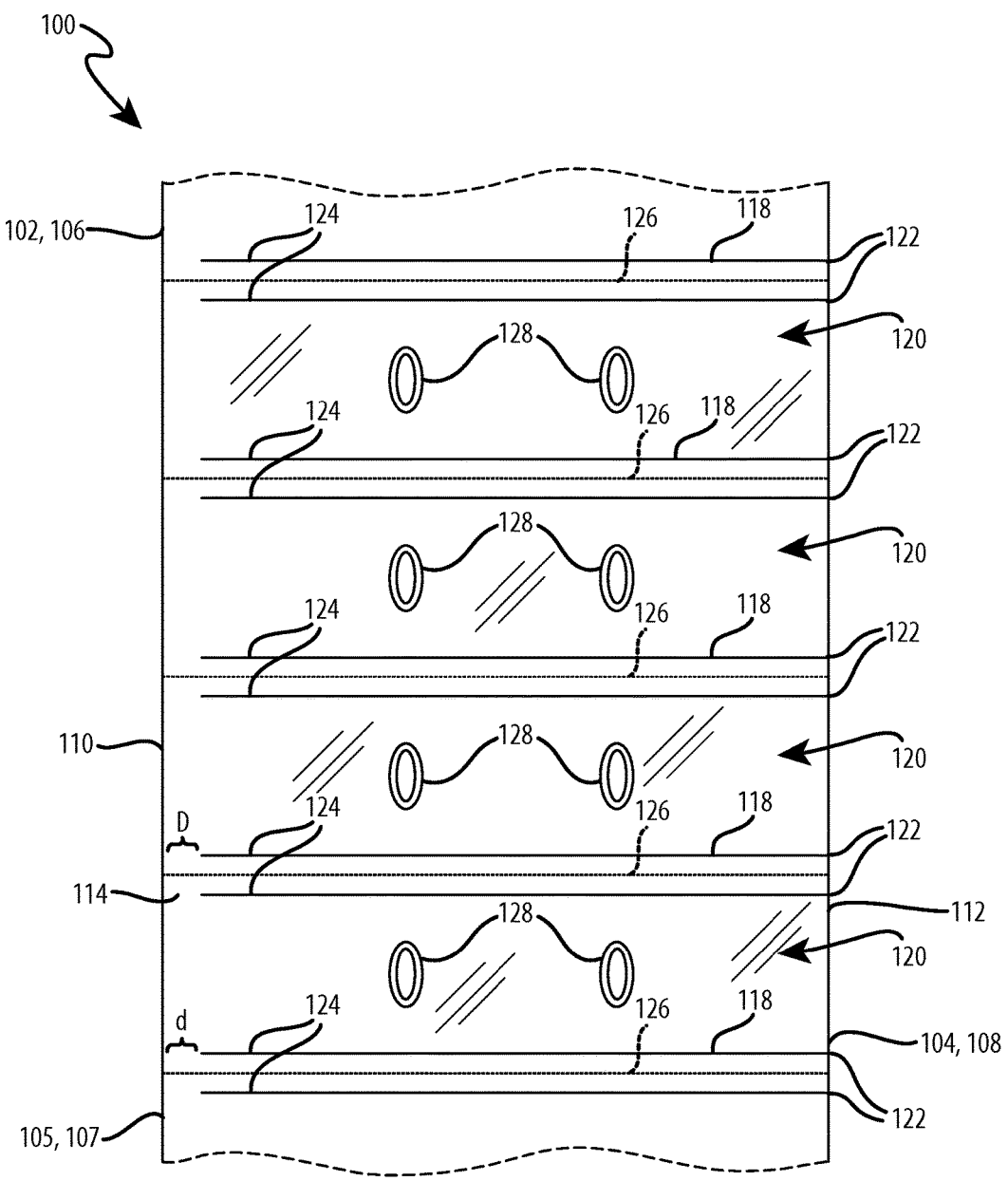
FIG. 1A-D are schematics of various embodiments of flexible structures as used in conjunction with an inflation and sealing device.
Figure 1B:
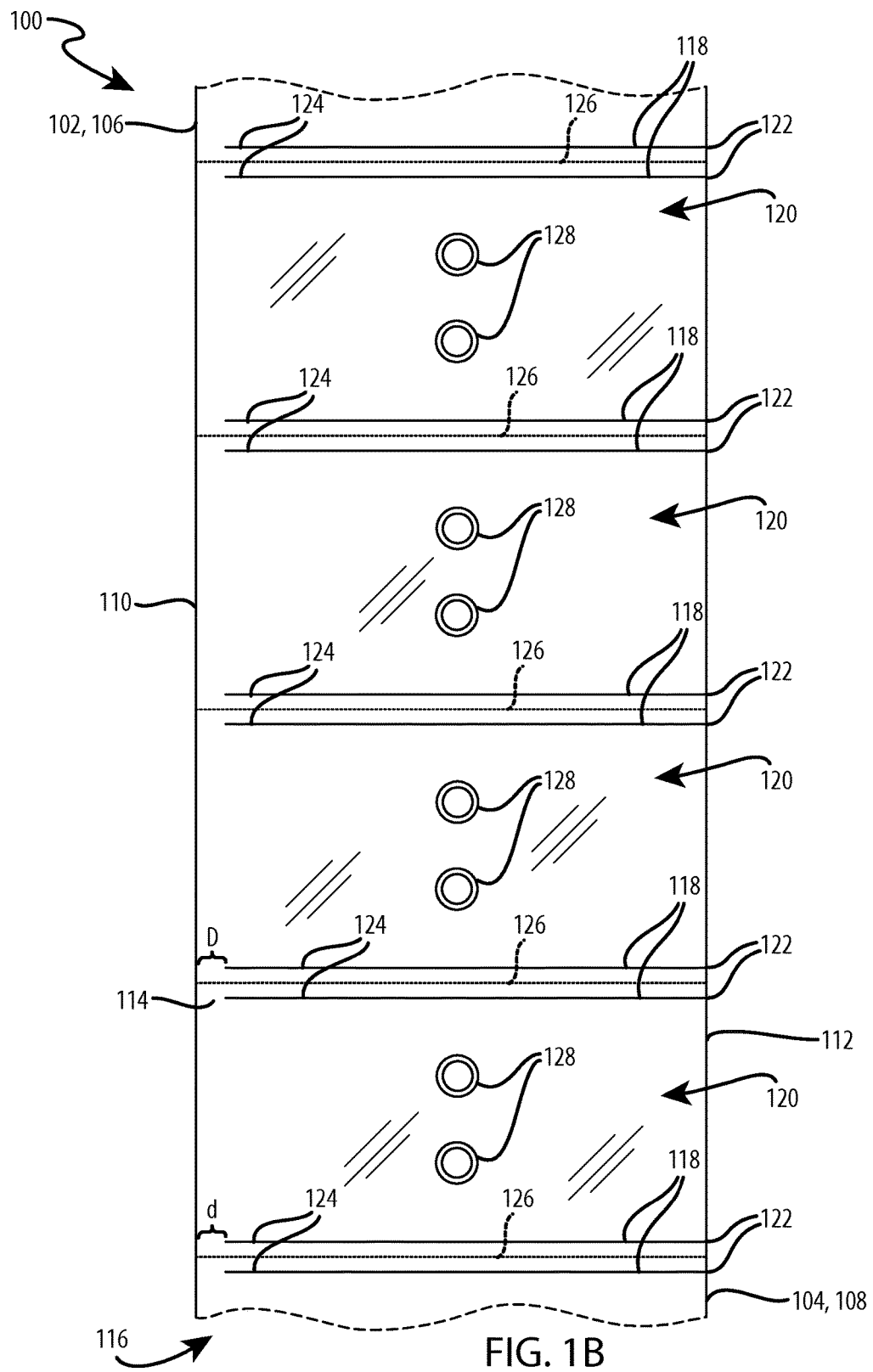
Figure 1C:
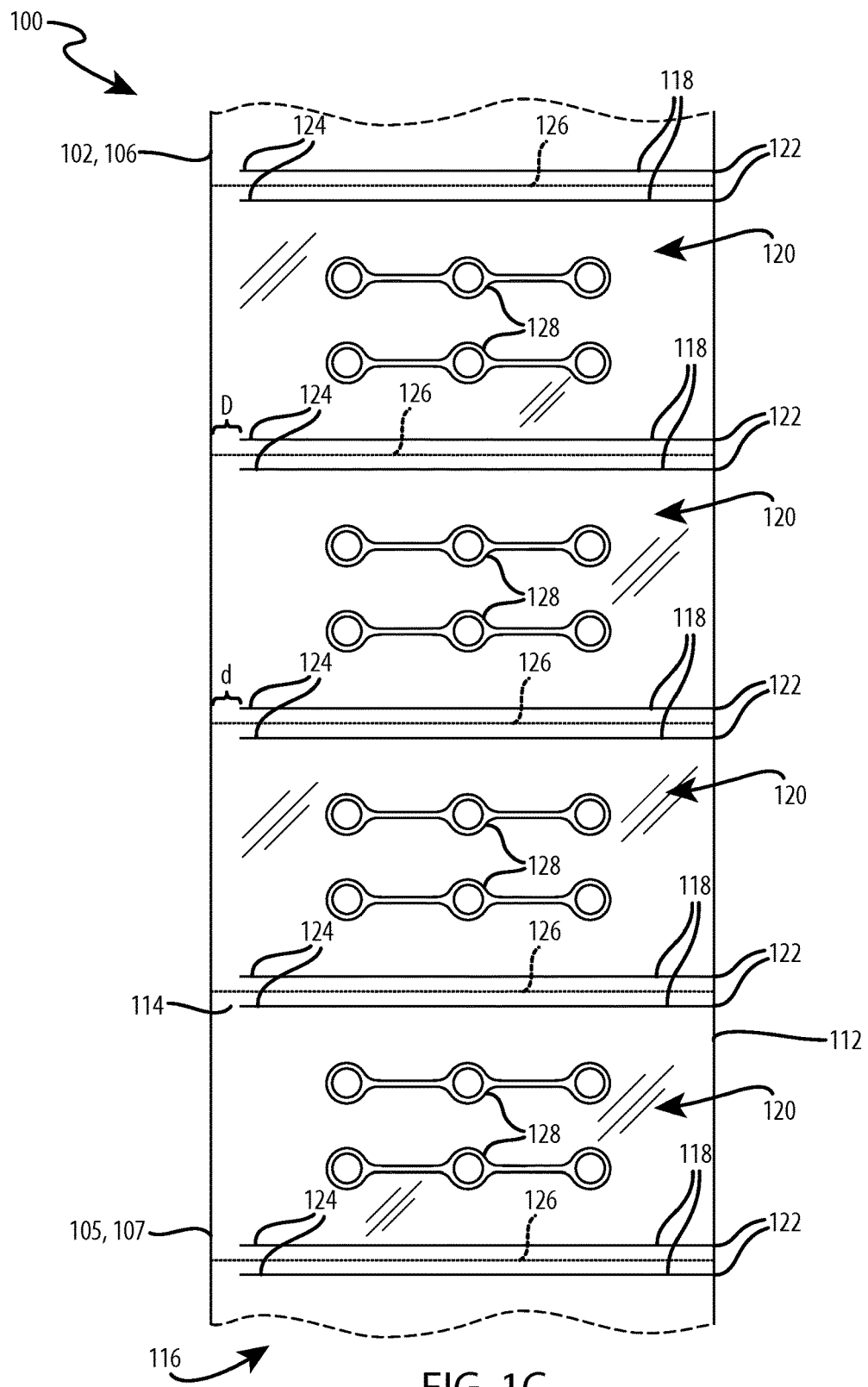

The present disclosure is related to systems and methods for converting uninflated material into inflated cushions that may be used as cushioning or protection for packaging and shipping goods. In some embodiments, the systems may include a control system for determining settings for one or more parameters based on a desired material to be inflated, as well as the geometry of the inflated cushions, speed of inflation, and other material parameters. The control system may also be configured to selectively modify the parameters of the packaging machine, such as, but not limited to, adjusting a speed of one or more motors (e.g., blower or drum motor), varying the temperature applied to a heating or sealing element, varying the fill rate or speed, as well as controlling the braking force applied to a roll brake. This allows the control system to selectively modify the packaging machine based on the packaging material and other material characteristics. In other words, the control system can adjust the machine to accommodate the material configuration (i.e., the specific material characteristics of the film). Some examples of material characteristics include the particular material, shape, cushion width, cushion length, cushion area, desired cushion volume, desired fill level, and/or other characteristics of the inflatable cushions.

The control system may refer to one or more recipes storing settings for a plurality of machine parameters selected based on the desired supply packaging material characteristics. For example, using a particular type of material with inflatable cushions have a first geometry, the control system can access a recipe specifying the speed of the drum roller, the temperature of the heating element, the speed of the blower motor, and so on. The control system can then automatically adjust the parameters on the machine and/or provide instructions to a user to manually adjust these parameters in some embodiments. Once the parameters are adjusted, the packaging system can be operated to create the desired packaging.

In some embodiments, the control system may analyze data to determine the type of material and other material characteristics (e.g., inflatable cushion geometries). For example, the roll of material may include an identifier, such as a radio frequency identification (RFID) that designates the type of material, the gauge or thickness, the length, the width, a perforation pattern, and/or pre-sealed pattern or other material features. The control system using one or more input sensors, such as a RFID scanner, analyzes the roll to receive the RFID. Once the RFID has been received, the control system adjusts the machine parameters based on the data stored in the RFID. In some embodiments, the recipes may be stored on the machine items or on a computing device in communication with the machine (e.g., via a network or WiFi). Alternatively or additionally, the RFID or other data on the roll may include settings for each of the parameters. In other words, the rolls may include the recipes or various settings for the machine parameters that can be transmitted to the control system prior to operation.

The control system may also be configured to vary parameters of the inflation and sealing assembly based on the change or variation of other parameters of the assembly. In some instances certain machine parameters may be correlated to each other or otherwise related by one or more functions. As one example, the speed of a drum motor may be directly related to the speed of the blower, the faster the drum motor spins a sealing drum, the faster the blower motor may have be in order to adequately fill the inflatable cushions with the increased speed of the drum. As another example, the speed of the drum may be related to the temperature setting of the heating element. In this example, as the drum slows down, the temperature may need to be reduced since the material may move slower past the heating element. Other parameters include parameters of the operation of the braking mechanism applied to the roll as it is unwound, such as the amount of braking friction or breaking torque applied against the forward, unwind direction of the roll, and of the drive mechanism, such as the ramp up and ramp down profiles for the various motors of the inflation and sealing assembly, and so on.

Using the various interdependencies of the machine parameters, the control system may automatically adjust or provide output to allow a user to adjust parameters based on the modification of other parameters. For example, if a user increases the speed of the drum motor, the control system may automatically adjust the application of the braking mechanism to slow the unwinding of the roll on the spindle or may provide output to alert a user to adjust the friction applied by the braking mechanism. In this manner the control system can help avoid errors or problems with the inflating and sealing assembly that could result from each of the parameters being adjusted improperly. Further, the control system may allow for more automation with the inflation and sealing assembly as the control system can determine the type of material loaded onto the spindle, adjust the assembly based on the type of material, and then operate the assembly without a user being required to interact with the inflation and sealing assembly. The control system may also include one or more sensors for various components of the machine. This allows the control system to dynamically adjust the parameters based on the actual output of the parameter, as well as dynamically adjust other parameters that are dependent on the adjusted parameter. This helps to ensure that the inflation and sealing assembly is running as desired, even as select parameters are adjusted.

In accordance with various embodiments, the various systems as discussed herein may be operable with any of a variety of mechanisms or systems for converting uninflated material into inflated flexible structures that may be used as cushioning or protection for packaging and shipping goods. Specifically, mechanisms prior to sealing and inflation and mechanisms post-sealing and inflation may improve the overall efficiency and speed of the process of forming the cushions. Prior to sealing and inflation, the system may include a material support element which better stores, controls, and delivers the material to the sealing and inflation mechanisms. After the sealing and inflation of the material, material control elements may better direct the material out of the system without damaging the seal or failing to release the heater material from the contact surfaces.

Illustrative embodiments and examples will now be described to provide an overall understanding of the disclosed apparatus. Those of ordinary skill in the art will understand that the disclosed apparatus can be adapted and modified to provide alternative embodiments of the apparatus for other applications, and that other additions and modifications can be made to the disclosed apparatus without departing from the scope of the present disclosure. For example, features of the illustrative embodiments can be combined, separated, interchanged, and/or rearranged to generate other embodiments. Such modifications and variations are intended to be included within the scope of the present disclosure.

Each of the embodiments, examples, aspects, representations, and illustrations of subject matter discussed herein may incorporate the embodiments, examples, aspects, representations, and illustrations as disclosed, for example in U.S. application Ser. No. 13/844,741. Similarly, the subject matter discussed herein may also be incorporated into the various system disclosed in the incorporated references. The various embodiments discussed herein or referenced herein are not meant to stand alone, but may be combined with other embodiments from the other referenced applications or various other embodiments disclosed herein. For example, the incorporated references variously describe inflation mechanisms (e.g. the variously structured nozzles, cutting devices, and air blowers) and sealing mechanisms (e.g. the variously disclosed sealing drums), each of which may be used herein as the inflation and sealing device utilized to process the web and form the resultant cushions.

FIGS. 1A-1D illustrates schematics of various embodiments of flexible structures. The flexible structure, such as a multi-layer web 100 of film, for inflatable cushions is provided as an example of a film structure usable with the various systems discussed herein, with understanding that a person of ordinary skill in the art will recognize the applicability of other film structures to the systems discussed herein. In various examples, the web includes a first film layer 105 having a first longitudinal edge 102 and a second longitudinal edge 104, and a second film layer 107 having a first longitudinal edge 106 and a second longitudinal edge 108. The second web layer 107 is aligned to be over lapping and can be generally coextensive with the first web layer 105 (as shown in FIGS. 1A-1D), i.e., at least respective first longitudinal edges 102,106 are aligned with each other and/or second longitudinal edges 104,108 are aligned with each other. In some embodiments, the layers can be partially overlapping with inflatable areas in the region of overlap. The layers may be joined to define a first longitudinal edge 110 and a second longitudinal edge 112 of the film 100. The first and second web layers 105,107 can be formed from a single sheet of web material, a flattened tube of web material with one edge slit, or two sheets of web material. For example, the first and second web layers 105,107 can include a single sheet of web material that is folded to define the joined second edges 104,108 (e.g., "c-fold film"). Alternatively, for example, the first and second web layers 105,107 can include a tube of web material (e.g., a flatten tube) that is slit along the aligned first longitudinal edges 102,106. Also, for example, the first and second web layers 105,107 can include two independent sheets of web material joined, sealed, or otherwise attached together along the aligned second edges 104, 108.

The web 100 can be formed from any of a variety of web materials known to those of ordinary skill in the art. Such web materials include, but are not limited to, ethylene vinyl acetates (EVAs), metallocenes, polyethylene resins such as low density polyethylene (LDPE), linear low density polyethylene (LLDPE), and high density polyethylene (HDPE), and blends thereof. Other materials and constructions can be used. The disclosed web 100 can be rolled on a hollow tube, a solid core, or folded in a fan folded box, or in another desired form for storage and shipment.

As shown in FIGS. 1A-1D, the web 100 can include a series of transverse seals 118 disposed along the longitudinal extent of the web 100. Each transverse seal 118 extends from the longitudinal edge 112 towards the inflation channel 114, and in the embodiment shown, toward the first longitudinal edge 110. Each transverse seal 118 has a first end 122 proximate the second longitudinal edge 112 and a second end 124 spaced a transverse dimension d from the first longitudinal edge 110 of the film 110. A chamber 120 is defined within a boundary formed by the longitudinal seal 112 and pair of adjacent transverse seals 118.

Each transverse seal 118 embodied in FIGS. 1A-1D is substantially straight and extends substantially perpendicular to the second longitudinal edge 112. It is appreciated, however, that other arrangements of the transverse seals 118 are also possible. For example, in some embodiments, the transverse seals 118 have undulating or zigzag patterns.

The transverse seals 118 as well as the sealed longitudinal edges 110,112 can be formed from any of a variety of techniques known to those of ordinary skill in the art. Such techniques include, but are not limited to, adhesion, friction, welding, fusion, heat sealing, laser sealing, and ultrasonic welding. An inflation region, such as a closed passageway, which can be a longitudinal inflation channel 114, can be provided. The longitudinal inflation channel 114, as shown in FIG. 1, is disposed between the second end 124 of the transverse seals 118 and the first longitudinal edge 110 of the film. Preferably, the longitudinal inflation channel 114 extends longitudinally along the longitudinal side 110 and an inflation opening 116 is disposed on at least one end of the longitudinal inflation channel 114. The longitudinal inflation channel 114 has a transverse width D. In the preferred embodiment, the transverse width D is substantially the same distance as the transverse dimension d between the longitudinal edge 110 and second ends 124. It is appreciated, however, that in other configurations other suitable transverse width D sizes can be used.

The second longitudinal edge 112 and transverse seals 118 cooperatively define boundaries of inflatable chambers 120. In one preferred embodiment, the inflatable chambers 120 may further include intermediate seals 128. The intermediate seals 128 may seal the 105, 107 to one another at intermediate areas in the chamber 120. As shown in FIG. 1, opposing intermediate seals 128 are transversely aligned across the chamber 120. The intermediate seals 128 create bendable lines that allow for a more flexible web 100 that can be easily bent or folded. Such flexibility allows for the film 100 to wrap around regular and irregular shaped objects.

A series of lines of weaknesses 126 is disposed along the longitudinal extent of the film and extends transversely across the first and second web layers of the film 100. Each transverse line of weakness 126 extends from the second longitudinal edge 112 and towards the first longitudinal edge 110. Each transverse lines of weakness 126 in the web 100 is disposed between a pair of adjacent chambers 120. Preferably, each line of weakness 126 is disposed between two adjacent transverse seals 118 and between two adjacent chambers 120, as depicted in FIG. 1. The transverse lines of weakness 126 facilitate separation of adjacent inflatable cushions 120.

The transverse lines of weakness 126 can include a variety of lines of weakness known by those of ordinary skill in the art. For example, in some embodiments, the transverse lines of weakness 126 include rows of perforations, in which a row of perforations includes alternating lands and slits spaced along the transverse extent of the row. The lands and slits can occur at regular or irregular intervals along the transverse extent of the row. Alternatively, for example, in some embodiments, the transverse lines of weakness 126 include score lines or the like formed in the web material.

The transverse lines of weakness 126 can be formed from a variety of techniques known to those of ordinary skill in the art. Such techniques include, but are not limited to, cutting (e.g., techniques that use a cutting or toothed element, such as a bar, blade, block, roller, wheel, or the like) and/or scoring (e.g., techniques that reduce the strength or thickness of material in the first and second web layers, such as electro magnetic (e.g., laser) scoring and mechanical scoring).

Figure 2:
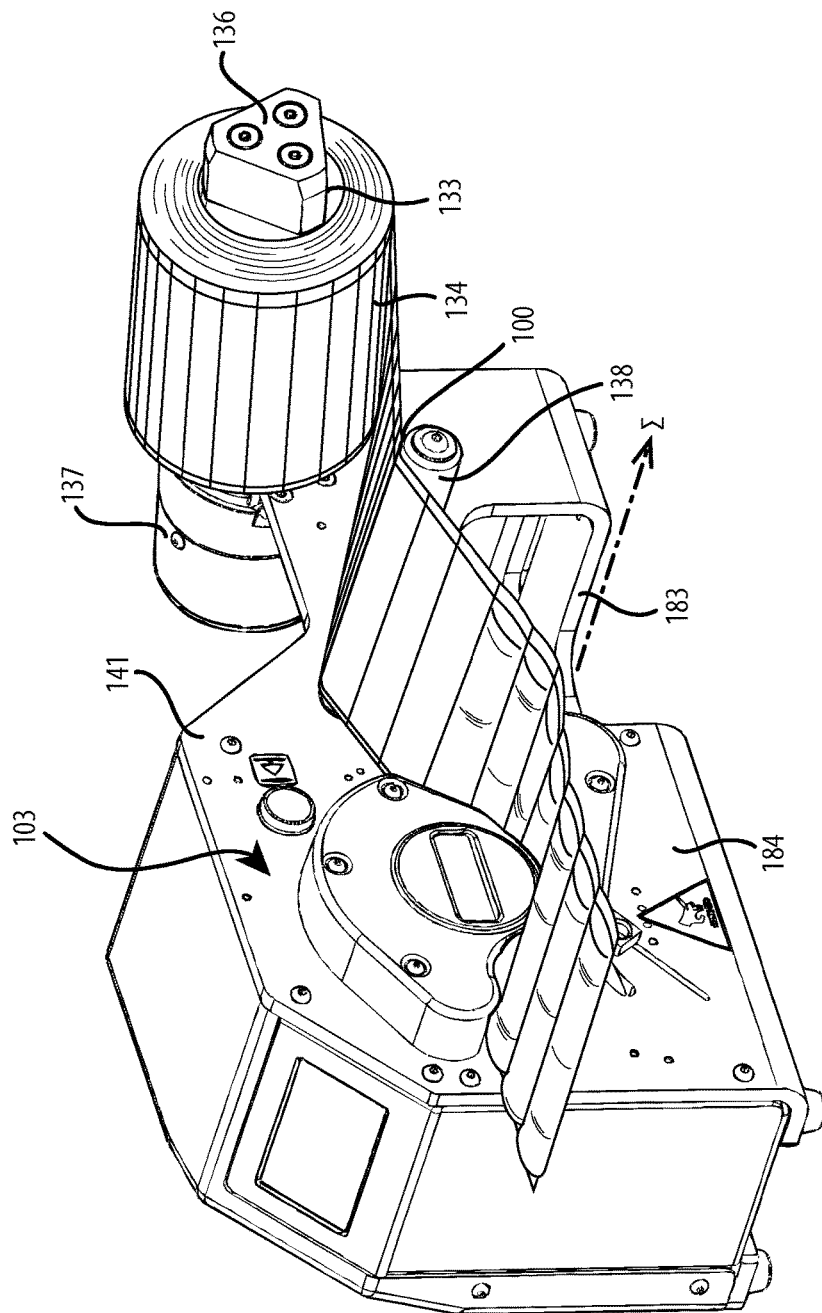
FIG. 2 is perspective view of an inflation and sealing device in accordance with various embodiments.
Figure 3:
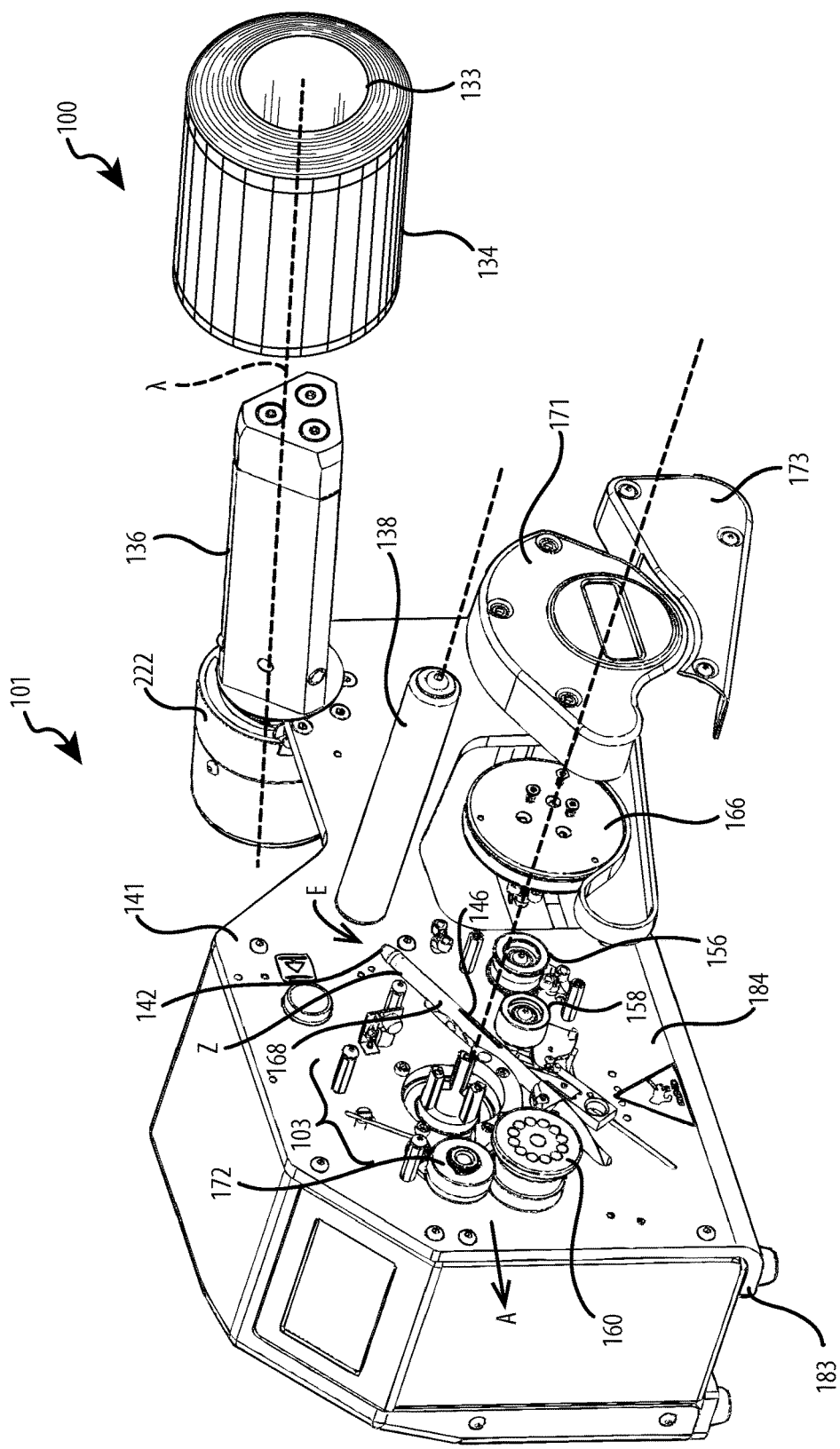
FIG. 3 is a perspective, exploded view thereof.

Turning now to FIG. 2, an inflation and sealing device 101 for converting a flexible structure such as web 100 of uninflated material into a series of inflated pillows or cushions 120 is provided as an example of inflation and sealing devices that are usable with the various other systems discussed herein. As shown in FIG. 2, the uninflated web 100 can be a bulk quantity of supply, uninflated material. For example, the bulk quantity of uninflated material may be a roll of the material 134 as illustrated in FIGS. 2 and 3. The web 100 may be rolled around an inner support tube 133.

Figure 4:
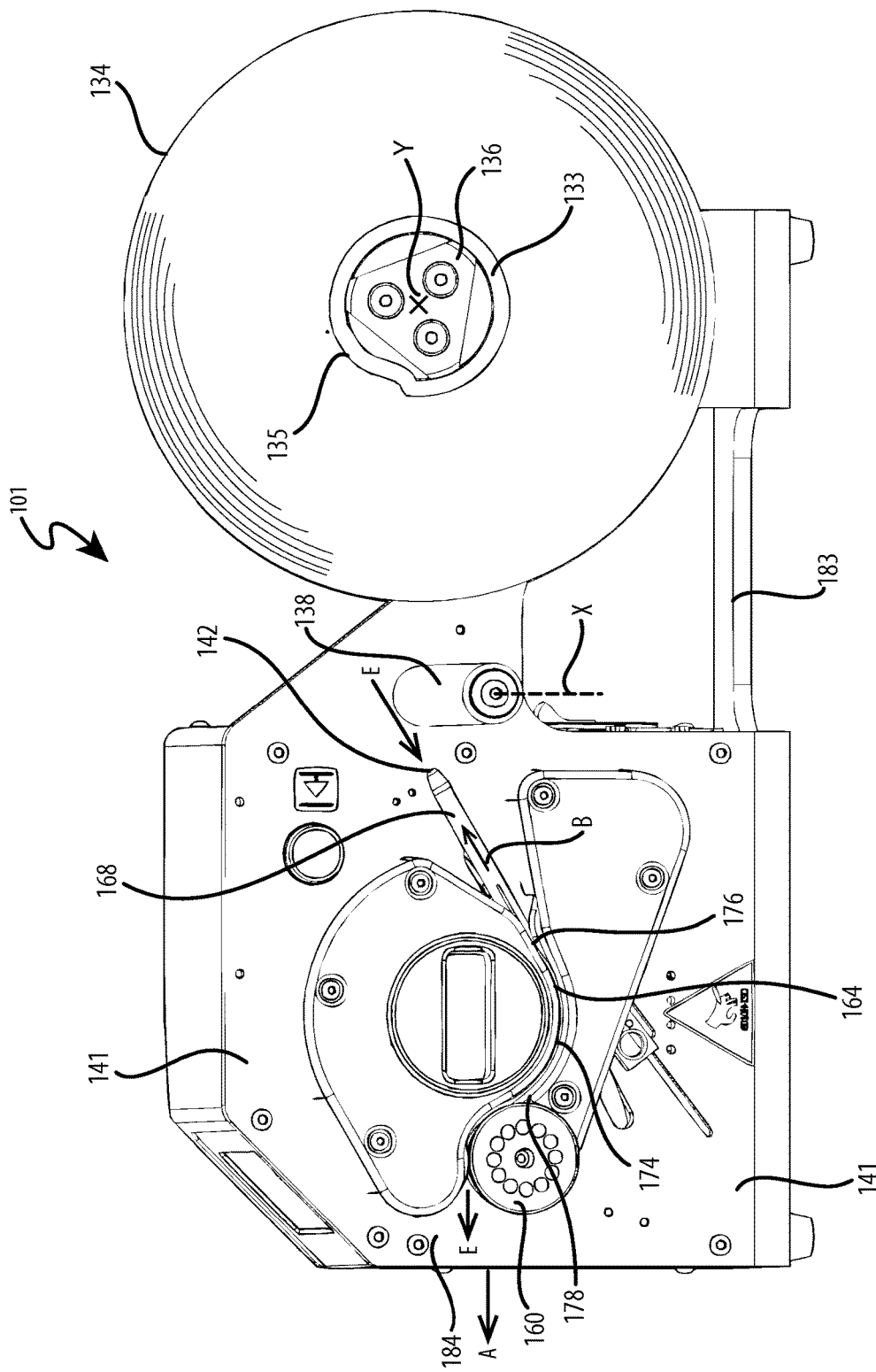
FIG. 4 is a top, right-side view as seen along axis Y of a material support thereof.

The inflation and sealing device 101 may include a bulk material support 136. The bulk quantity of uninflated material may be supported by the bulk material support 136. For example, the bulk material support may be a tray operable to hold the uninflated material, which tray can be provided by a fixed surface or a plurality of rollers for example. To hold a roll of material the tray may be concave around the roll or the tray may convex with the roll suspended over the tray. The bulk material support may include multiple rollers which suspend the web. The bulk material support may include a single roller that accommodates the center of the roll of web material 134. As illustrated in FIGS. 2-4, the roll of the material 134 may be suspended over the bulk material support 136, such as a spindle passing through the core 133 of the roll of the material 134. Typically, the roll core is made of cardboard or other suitable materials. The material support 136 may rotate about an axis Y.

The web 100 may be suspended over a guide 138 after being pulled off of the supply of uninflated material (e.g., roll 134). The guide may provide support to the web 100 upon a transition from the bulk quantity of uninflated material to the sealing and inflation mechanism 103 discussed in more detail below. The guide may be a stationary rod extending from a support member 141. As shown in FIGS. 2-4, the guide 138 may be a roller that which extends from the support member 141. The guide 138 may have an axis X around which the guide 138 rotates. The guide 138 or the axis X may extend generally perpendicularly from the support member 141. The guide 138 directs the web 100 away from the bulk quantity of uninflated material (e.g. roll 134) and steadily along a material path "B" along which the material is processed in a longitudinal direction "A". As the bulk quantity of uninflated material may change position or dimension as the web 100 is continuously pulled from it (e.g. the roll 134 may decrease in diameter as material is pulled off), the guide may maintain alignment with the sealing and inflation mechanism despite these changes, and preferably with the upstream end of inflation tip 142. The guide 138 can be configured to limit the material 134 from sagging between the inflation nozzle 140 and roll 134, and can help maintain any desired tension in the web 100 of the material.

In accordance with various embodiments, the inflation and sealing device 101 may include a support member 141. The support member 141 may include a base member 183 and a vertical member 186. The vertical member 186 may locate the inflation and sealing assembly 103, guide 138, and material support 136 relative to one another. The vertical member may be a flat wall. In various embodiments, the vertical member may have a verity of shapes that may extend in various directions. The vertical member 186 may be a single component which 103, 138 and 136 all attach to. In this manner the various components the inflation and sealing assembly 103, guide 138, and material support 136 may have tolerances relative to one another based on the tolerances in the formation of the single component. This may very accurately locate the components relative to one another. Additionally the vertical member 186 and the base member 183 may be a single component. For example, a bent piece of steel may form the vertical member 186 the base member 183.

In accordance with various embodiments, the material support 136 may extend from the support member 141 at an angle different than the angle from which guide 138 extends from the support member 141. As indicated above, guide 138 may extend from the support member 141 generally perpendicularly, whereas the material support 136 may extend from the support member 141 non-perpendicularly. In other embodiments, neither the guide 138 nor the material support 136 may extend from the support member 141 perpendicularly.

Figure 5:
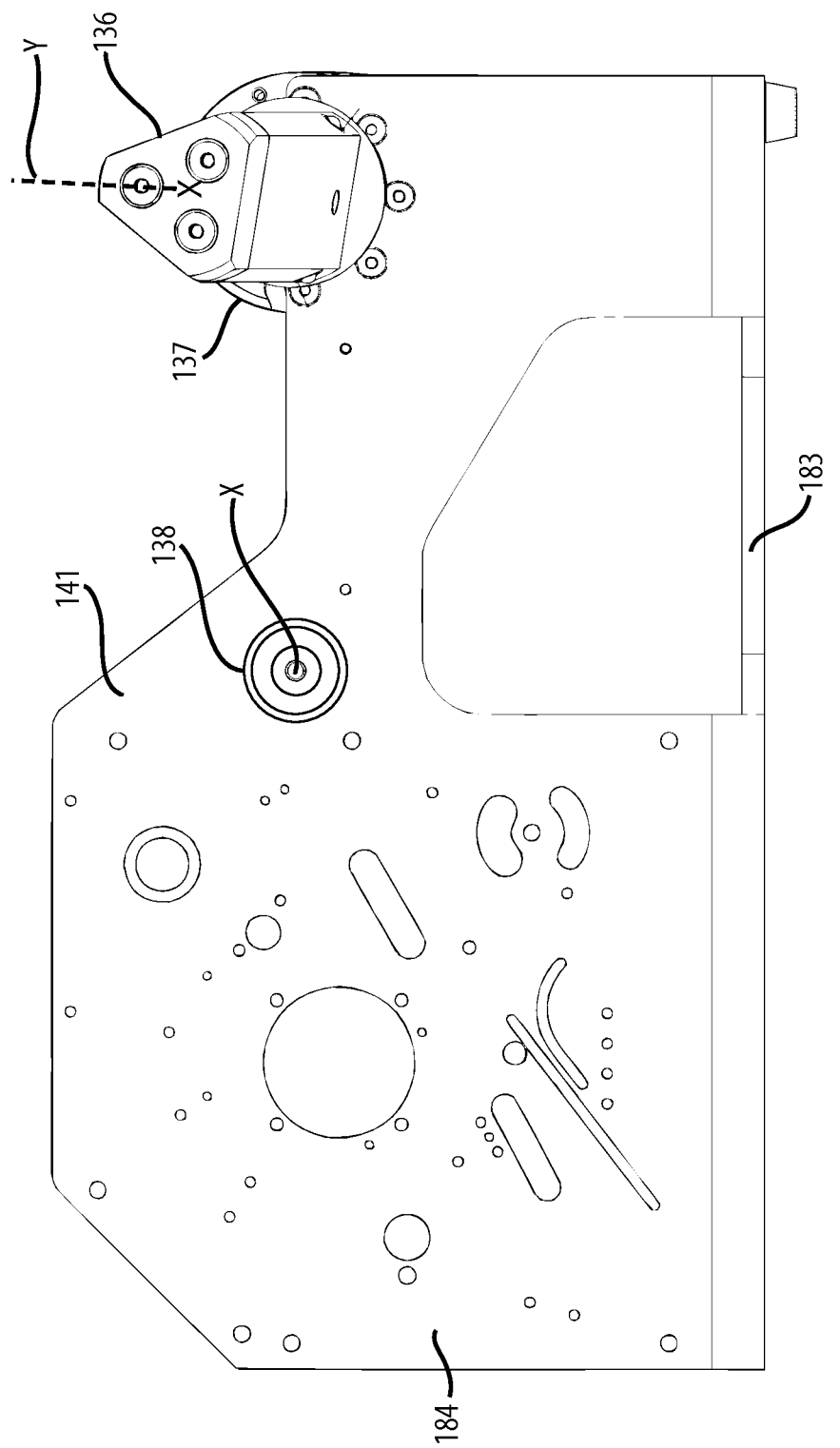
FIG. 5 is a right-side view of a partially assembled system thereof.

FIG. 4 illustrates a view of the inflation and sealing device 101 along axis Y. As shown here, the material support 136 is shown on its end, but the length of the guide 138 is shown in an isometric view illustrating an angular difference between the two. Notably here, the axis Y extends up compared to axis X. FIG. 5 illustrates a front view showing the end of guide 138 but a bottom isometric view of material support 136. Again, the axis Y extends up compared to axis X. In accordance with various embodiments, axes Y and X may be skew axes (i.e. the axes may be neither parallel nor intersecting). The relative position of these axes indicates the relative position of the material support 136 and the guide 138. In accordance with embodiments discussed herein, the material support 136 and the guide 138 may rotate around axes Y and X respectively. The axis X may be perpendicular to the support member 141 with Y being non-perpendicular to the support member 141.

Figure 6:
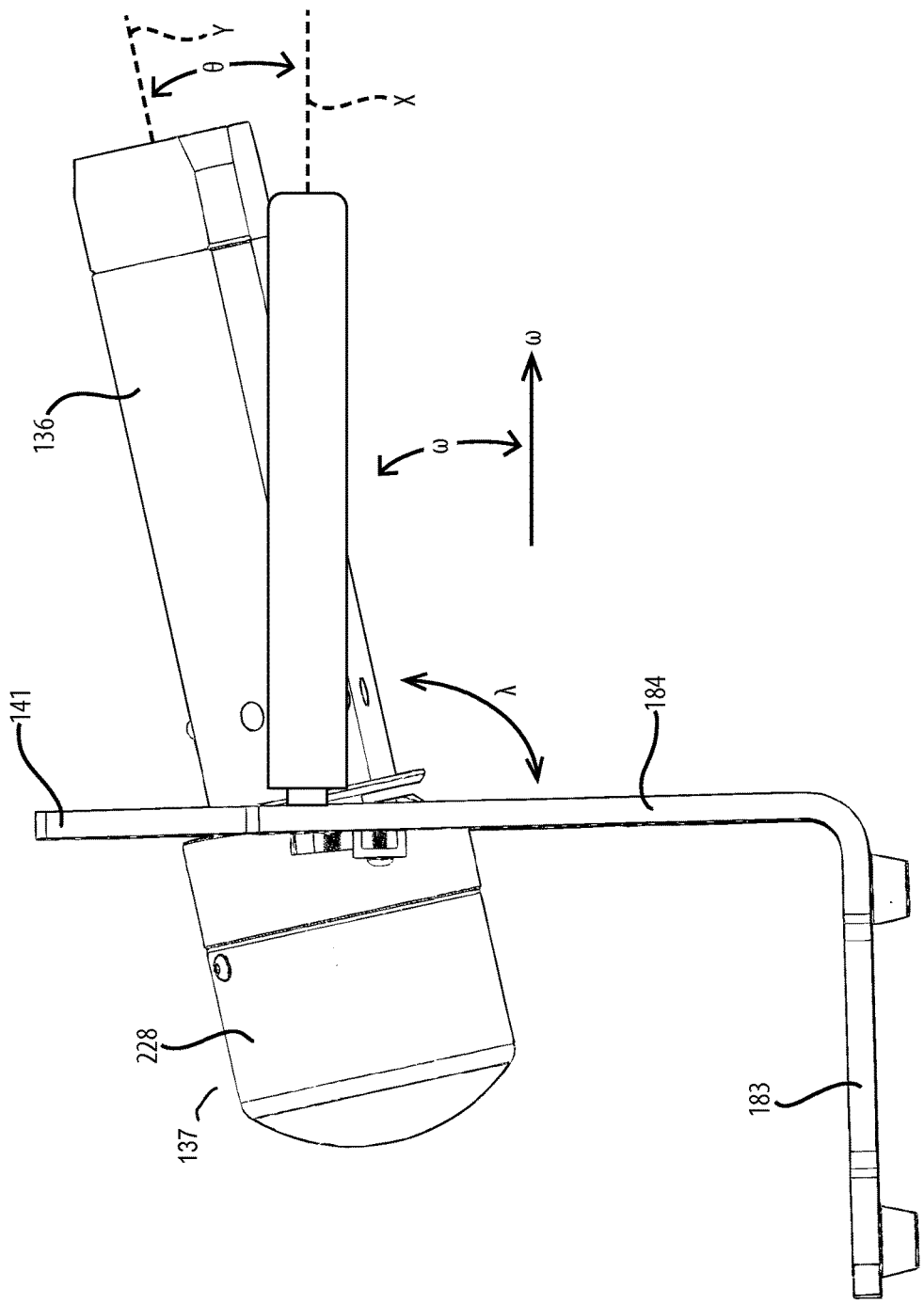
FIG. 6 is a front view of the partially assembled device of FIG. 5.

As illustrated in FIG. 6, axis Y or the material support 136 may be positioned at an angle λ relative to the front wall 139 of the support member 141. The angle λ may be greater than 90°. For example, λ may be 70° to 140°. In one example, λ may be about 100°. However, the material support 136 and the guide 138 may be attached to different surfaces or at different angles, such as both pointed upwards with respect to the front wall 139 or both pointed down words with respect to the front wall. As viewed from the side (e.g. FIG. 6), the angle between axis X and axis Y may be Θ. Θ may be an angle between the axes that ranges from about 5° to about 70°. Θ may be an angle between the axes that ranges from about 10° to about 45°. In accordance with various embodiments, the web 100 may travel through the inflation and sealing device 101 along path E. As illustrated in FIGS. 3 and 4, the film path E extends along the nozzle 140. An axis Z is located where the film path E follows the nozzle 140. In accordance with various embodiments, the direction that nozzle 140 points is the same direction axis Y points. For example if nozzle 140 points up (e.g. away from base 183) then axis Y points up. If nozzle 140 points down (e.g. toward base 183) then axis Y points down.

In various embodiments, the web 100 may pass above the guide 138. In such embodiments, the material support 136 and axis Y may be angled with respect to guide 138 such that the material support 136 and axis Y point in the same direction as the web 100 passes over guide 138. If web 100 passes over guide 138 then the material support 136 may point up relative to the guide 138. If web 100 passes under then guide 138, then the material support 136 may point down relative to guide 138.

In accordance with various embodiments, the web 100 passes through the inflation and sealing assembly 103 and extends away from the inflation and sealing device 101 in a transverse direction which is perpendicular to longitudinal direction A in which the web 100 exits the inflation and sealing device 101. An axis W may be aligned at the pinch area 176 and extend in the transverse direction away from the inflation and sealing device 101. The angle ω between the axis W and the axis Y may be an angle between the ranges from about 5° to about 70°. The angle ω between W and the axis Y may be an angle between about 10° to about 45°. The angle may be viewed in the longitudinal direction such as from the front of the inflation and sealing device 101 such as shown in FIG. 6.

In some embodiments axes Y and X may be parallel, for example both extending though the support member 141 perpendicularly, both may extend downwardly, or both may extend upwardly. As indicated above Y and X may be non-parallel with both extending downwardly, or both extending upwardly.

When the web 100 is removed from the material support 136 and is positioned at an angle different from the guide 138, the web 100 includes a slight twist as it is removed from the bulk quantity of uninflated material (e.g. roll 134) and re-aligned over and in contact with guide 138. The web 100 may roll off of material support 136 tangentially and thereby forming a plane (or a surface that approximates a plane tangential with the surface of the roll 134) that is parallel with the axis of material support 136. The web 100 may also engage guide 138 tangentially forming a different plane (or approximating a different plane tangent with the guide 138). The web may merely reflect tangential planes as if it maintained tangential contact with the material support 136 or guide 138 even if in practice there is tension on one transverse end of the web 100 and slack on the other transverse end of the web 100. In order to accommodate both tangential contacts the web 100 may realign or twist slightly between the material support 136 and guide 138. This realignment of the web 100 may cause this slight twist which may affect the way that the web 100 contacts guide 138. In embodiments wherein angle λ is greater than 90 degrees, the slight twist causes the web 100 to have greater pressure against the guide 138 proximate to the connection between guide 138 and the support member 141. The web 100 may have lesser pressure and less tension on the end of guide 138 that is distal to the connection between guide 138 and the support member 141. This configuration of contact between web 100 and guide 138 aids in maintaining alignment of the web toward the sealing mechanism and limiting the tendency of the web 100 to drift off the end of guide 138 that is distal of the support member 141. On a related note, the end of the material support 136 can have a tendency to sag underweight, such as under the weight of a roll of material 134 being mounted thereon. As such, in response to the material support 136 being structured extending perpendicularly from the support member 141, the material support 136 and or axis Y tends to deflect downwardly when the roll of material 134 is mounted thereon. In this position the opposite effect to the one discussed above occurs. The web 100 may contact the guide 138 with greater pressure on the end of the guide 138 that is distal to the support member 141. Conversely, the side of the guide 138 that is proximate to the support member 141 may have less pressure between the guide 138 and the web 100 as compared to the distal end of guide 138. In this way, web 100 may tend to drift off the guide 138, become un-aligned with the sealing and inflation mechanism, or acquire slack between the roll of material 134 and the sealing and inflation mechanism. Thus, by structuring the material support 136 with an angle greater than the guide 138 as measured upwardly from the support member 141 (e.g. see FIG. 6) the sag in the material support 136 and the tension issues with the guide 138 may be overcome, thereby improving the intake of web 100 into the sealing and inflation mechanism.

In accordance with various embodiments, the nozzle 140 may inflate web 100 not only at a transverse edge but may engage an inflation channel located at any transverse distance between the longitudinal edges; i.e., the inflation and sealing device 101 fills a central channel with chambers on both transverse sides of the inflation channel. The web 100 may roll off of material support 136 and over guide 138 in a manner that aligns such a central inflation channel with the nozzle 140.

As discussed above, in various embodiments the material support 136 may include a spindle 200. The spindle 200 may be axially aligned along axis Y with a motor 220. The motor 220 and the spindle 200 may be attached via a bulkhead connector 222. The bulk head connector 222 may have a mounting surface 223. The mounting surface may attach to the backside of the support member 141 such that the motor 220 may be positioned on one side and the spindle 200 may be positioned on the other side as illustrated in FIG. 6. The mounting surface 223 may form an angle with axis Y such that axis Y is not perpendicular thereto. For example, FIG. 6 shows mounting surface 223 as parallel with vertical plate 184. As such, λ represents the angle between mounting surface 223 and Y. Instead, the mounting surface 223 may be angled such that as it attaches to the back side of the support member 141, it tilts the spindle 200 and motor 220 relative to the support member 141. An example of this structure is shown in FIG. 6 with the angle λ which may also represent the angle between mounting surface 223 and the axis Y. Spindle 200 may be supported within the bulk head connector 222 by bearings 214 and 224. The bearings 214,224 may allow the spindle 200 to be rotatable independent of the bulkhead connector 222 and ultimately the support member 141, to which the bulkhead connector 222 attaches. In various embodiments, the spindle may be supported on a shaft, surface bearings, or by the motor directly. The spindle 200 may be locked into place on the bulk head 222 with clip 226. Cover 228 and bulk head connector 222 may form an enclosure around motor 220.

The spindle 200 may include two sections, a body portion 202 and a tip portion 204. The body portion 202 and the tip portion 204 may be formed of different materials. 6. The spindle 200 preferably has core support portions 206, which are spaced circumferentially about axis Y from each other to provide radially recessed areas 208 therebetween. The core support portions 206 protrude radially from the axis Y higher than the surfaces of the spindle 200 in the radially recessed areas 208. The core support portions can collectively define and be positioned along a phantom cylindrical surface that will correspond closely to the interior, hollow, surface within a supply roll 134. If other shaped cores are to be used, the core support portions can be arranged in other shapes. The core support portions 206 can be curved circumferentially along this phantom cylindrical surface or can be flat or have other shapes. The recessed areas 208 are positioned radially inward of the phantom cylinder, so that they entirely or in large part do not contact the interior of a supply roll mounted on the spindle 200. The recessed areas 208 have substantially flat surfaces in the embodiment shown, but other configurations can be used.

Figure 7:
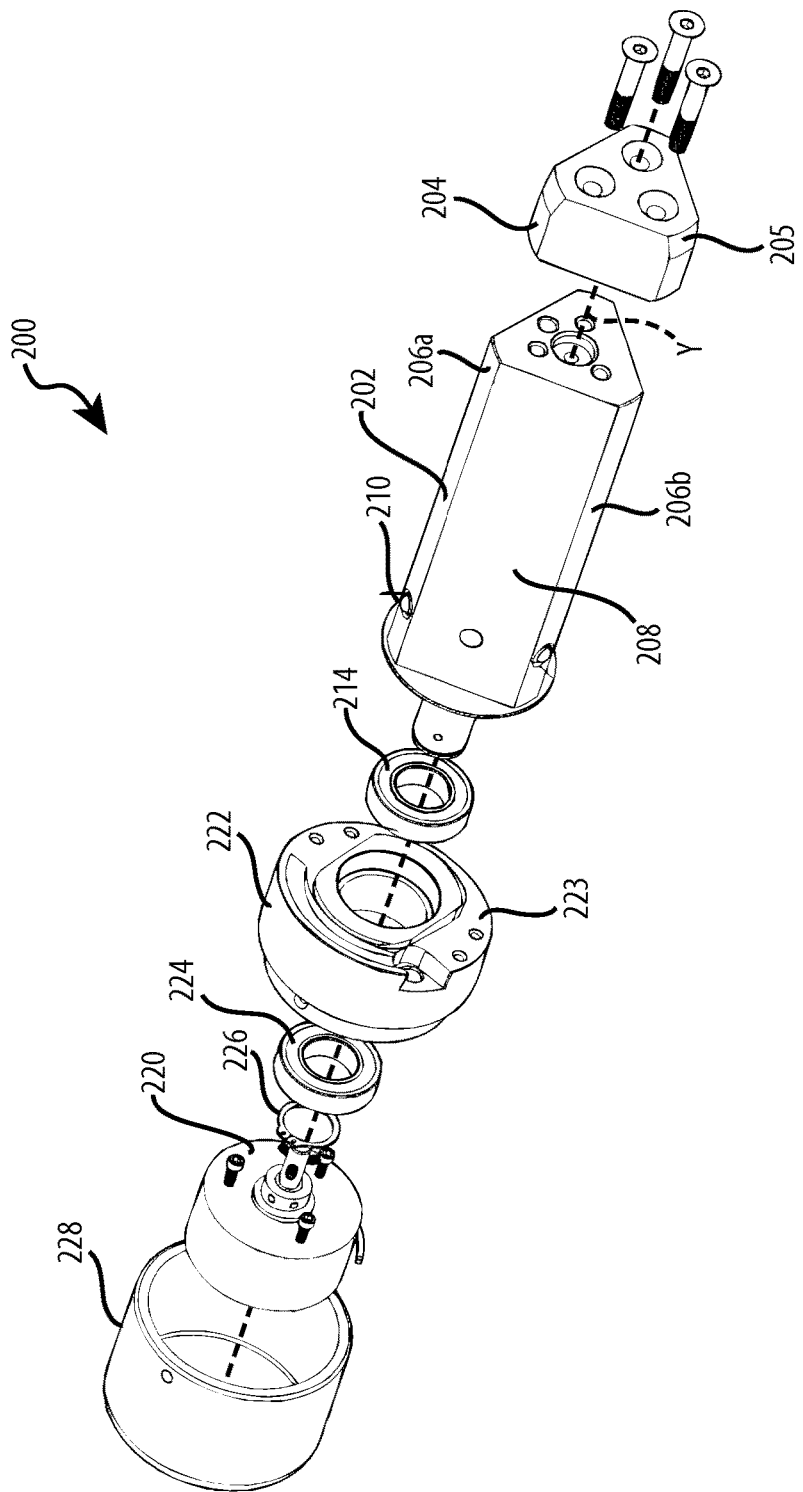
FIG. 7 is a perspective, exploded view of a material support and brake of the device of FIG. 2.

In the embodiment of FIG. 7, the recessed areas 208 lie below the phantom cylinder 207, and the core support portions 206 generally follow the phantom cylinder 207, although other shapes can be used. In this manner, the spindle 200 may be generally triangular in shape having three core support portions 206, but can alternatively have four, five, or more core support surfaces, and the core support portions can be evenly or unevenly distributed circumferentially about the spindle. The core support surfaces 206 preferably extend substantially axially with respect to the spindle (transversely with respect to the material path or machine direction in the embodiment of FIG. 2) to help in sliding a web roll core 133 on and off the spindle.

By providing the recessed areas between the core support portions 206 provides the spindle with a discontinuous support surface in which the contact area it has with a core 133 of a supply web roll 134 can be reduced compared to traditional, continuous-surface cylindrical spindles. This reduces the friction between the spindle 200 and core 133, allowing the core 133 to be more easily inserted and slid off from the spindle 200. Additionally, as is common and can be seen in FIG. 4, the core 133 can be deformed, such as by damage during shipping of the supply material roll 134. Damaged, out-of-round cores can be very difficult or impossible to insert onto a fully cylindrical spindle. The recessed areas 208 on the discontinuous spindle surface can accommodate deformations of the core 133 that extend inwardly between the core support portions 206, allowing dented or flattened cores to remain useable. In this way, the core support surfaces 206a,b,c or a plurality of grip elements 210 which extend from the core support surfaces 206a,b,c, may contacts or occupy only a fraction of the outer core surface circumference. The plurality of contacts may contact a finite number of points within an internal surface of a hollow tube onto which the web of material is rolled. In various examples, the plurality of grip elements 210 may extend beyond the generally cylindrical shape shown by line 207. The plurality of contacts may form a larger diameter around the spindle than the size of the inner diameter of inner support tube 133. This structure would allow the plurality of contacts to engage in an interference fit with the core 133 while the minimized outer cylindrical surface segments 206a,b,c minimize other contact within the core 133. Preferably, the grip elements 210 are biased outwardly and are resiliently movable inwardly into the spindle 200. Such bias can be provided by springs within the spindle. The outer surface of the grip elements 210 can be spherical, conical, or have another shape that preferably facilitates sliding of the core 133 during loading and unloading on or from the spindle, and that grips the inner surface of the core 133 during use, to help transfer torque from the spindle to the roll, and preferably from the brake 137, described below. A chamfer 204 at the end of tip portion 204 may additionally reduce the effort of inserting spindle 200 into the inner support tube 133.

Figure 8:
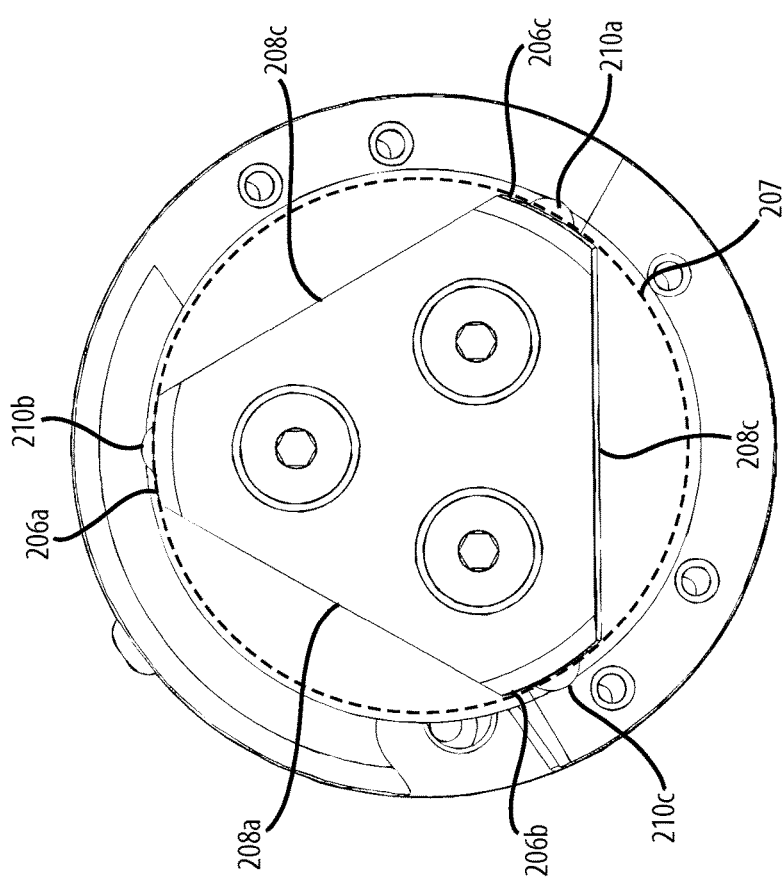
FIG. 8 is a right-side view of the material support and brake of the device of FIG. 2.

Referring back to FIGS. 2-6, the support element 136 may be connected with a brake 137. The brake 137 may prevent or inhibit bunching up of the web material 100 and maintain a desired tension in the web material 100 as it is unwound from the roll 134 and as it is fed onto and/or into the inflation and sealing mechanism. The brake 137 may prevent or inhibit release of the bulk uninflated material from the support 136. For example, the brake 137 may inhibit the free unwinding of the roll 134. The brake may also assure that the roll 134 is unwound at a steady and controlled rate. The brake 137 may be provided by any mechanism that provides control. For example, according to one embodiment, a spring-loaded leather strap or other friction mechanism can be used as a drag brake on the bulk material support 136. In another embodiment, the brake 134 may be an electric motor or other actuator used to provide resistance to the rotation of the bulk material support 136 as the roll 134 is unwound. As shown in FIGS. 7-8, the support element 136 is spindle 200 which is axially connected to a brake which may operate as a resistance mechanism. The resistance mechanism resists rotation of the support element 136 (e.g. spindle 200). The resistance mechanism may be motor 220 which controls rotation of the spindle 200, thereby controlling advancement of the web 100 by either positively driving rotation of spindle 200 or retarding the rotation of spindle 200. By retarding the rotation of spindle 200, the brake can also increase tension on the twisted web proximal to the support member 141, maintaining proper alignment with the inflating/sealing mechanism.

Preferably, the inflation and sealing device 101 is configured for continuous inflation of the web 100 as it is unraveled from the roll 134. The roll 134, preferably, comprises a plurality of chain of chambers 120 that are arranged in series. To begin manufacturing the inflated pillows from the web material 100, the inflation opening 116 of the web 100 is inserted around an inflation assembly, such as an inflation nozzle 140. In the embodiment shown in FIG. 2, preferably, the web 100 is advanced over the inflation nozzle 140 with the chambers 120 extending transversely with respect to the inflation nozzle 140 and outlet 146. The outlet 146, which can be disposed on a radial side and/or the upstream tip of the nozzle 140, for example, directs fluid from nozzle body 144 into the chambers 120 to inflate the chambers 120 as the web 100 advances along the material path "E" in a longitudinal direction "A". The inflated web 100 is then sealed by a sealing drum 166 in the sealing area 174 to form a chain of inflated pillows or cushions.

The side inflation area 168 in the embodiment of FIG. 3 is shown as the portion of the inflation and sealing device 101 along the path "E" adjacent the side outlets 146 in which air from the side outlets 146 can inflate the chambers 120. In some embodiments, the inflation area 168 is the area disposed between the inflation tip 142 and entry pinch area 176, described below. The web 100 is inserted around the inflation nozzle 140 at the inflation tip 142, which may be disposed at the forward-most end of the inflation nozzle 140. The inflation nozzle 140 inserts fluid, such as pressured air, along fluid path B into the uninflated web material through nozzle outlets, inflating the material into inflated pillows or cushions 120. The inflation nozzle 140 can include a nozzle inflation channel that fluidly connects a fluid source with the nozzle outlets. It is appreciated that in other configurations, the fluid can be other suitable pressured gas, foam, or liquid. FIGS. 3, 9, 10, and 11 illustrates a various view of the inflation and sealing device 101. As discussed in various embodiments, the fluid source can be disposed behind the support member 141 having a horizontal plate 183 and vertical plate 184 or other structural support for the nozzle and sealing assemblies, and preferably behind the inflation nozzle 140. The fluid source is connected to and feeds the fluid inflation nozzle conduit 143. The web 100 is fed over the inflation nozzle 140, which directs the web to the inflation and sealing assembly 103. The web 100 is advanced or driven through the inflation and sealing device 101 by a drive mechanism, such as by a driver or sealing drum 166 or the drive roller 160, in a downstream direction along a material path "E".

In accordance with various embodiments, the nozzle, blower sealing assembly, and drive mechanisms, and their various components or related systems may be structured, positioned, and operated as disclosed in any of the various embodiments described in the incorporated references such as for example U.S. patent application Ser. No. 13/844,741. Each of these embodiments may be incorporated to the inflation and sealing device 101 as discussed herein.

After being fed through the web feed area 164, the first and second web layers 105,107 are sealed together by the sealing assembly and exit the sealing drum 166. The sealing drum 166 includes heating elements, such as thermocouples, which melt, fuse, join, bind, or unite together the two web layers 105,107, or other types of welding or sealing elements. The web 100 is continuously advanced through the sealing assembly along the material path "E" and past the sealing drum 166 at a sealing area 174 to form a continuous longitudinal seal 170 along the web by sealing the first and second web layers 105,107 together, and exits the sealing area at an exit pinch area 178. The exit pinch area 178 is the area disposed downstream the entry pinch area 164 between the belt 162 and the sealing drum 166, as shown in FIG. 4. The sealing area 174 is the area between the entry pinch area 164 and exit pinch area 178 in which the web 100 is being sealed by the sealing drum 166. The longitudinal seal 170 is shown as the phantom line in FIG. 1. Preferably, the longitudinal seal 170 is disposed a transverse distance from the first longitudinal edge 102,106, and, most preferably, the longitudinal seal 170 is disposed along the mouths 125 of each of the chambers 120.

Preferably, as shown in FIG. 4, the sealing drum 166 is arranged above the belt 162. The roller 160 is preferably positioned downstream the feed roller 158 and tension roller 156 with the sealing drum 166 there between. The sealing drum 166 is disposed such that a portion of the sealing drum 166 vertically overlaps the feed roller 158, tension roller 156, and drive roller 160 so that the belt 162 is deformed at the sealing area 174 to have a generally U-configuration. Such configuration increases the tension of the belt 162 at the sealing area 174, and facilitates the pinching of the web 100 between the sealing drum 166 and the belt 162 at the sealing area 174. The inflation and sealing assembly 103 configuration described also reduces the amount of contact of the web 100 during sealing, which reduces bending of the inflated web. As shown in FIG. 7, the contact area is the sealing area 174 between the entering pinch area 164 and exiting pinch area 174.

In the embodiment shown, the web 100 enters the sealing assembly at the entry pinch area 176 at an angle sloping downward with respect to the horizontal. Additionally, the web 100 exits the sealing area 174 at an angle sloping upward with the respect to the horizontal so that the web 100 is exiting facing upwards toward the user. By having the intake and outtake sloped as described herein, the inflation and sealing device 101 allows for easy loading and extracting of the web as well as easy access to the web. Thus, the inflation and sealing device 101 can be positioned below eye level, such as on a table top, without the need of a high stand. The sloping downward intake and sloping upward outtake of the web 100 from the sealing assembly provides for the material path "E" to be bent at an angle α between the entry pinch area 176 and the exit pinch area 174 (the entry pinch area 176 and exit pinch area 174 are further described below). The angle α between the entry pinch area 176 and exit pinch area 174 is, for example, at least about 40 degrees up to at most about 180 degrees. The angle α may be about 90 degrees. Other entry and exit angles can be employed as known in the art in alternative embodiments.

In accordance with various embodiments, the sealing assembly may be protected by a removable cover. Likewise, the belt mechanism, e.g. belt 162, tension roller 156, and feed roller 158 may also include a removable cover 173. This allows for a user to easily remove the web or clear up or fix jams within the machine.

In accordance with various embodiments, one or more of the elements of inflation and sealing device 101 may drive web 100 through the system. For example, the sealing drum 166 may be connected to a motor which rotates it in a direction "F". As described in various embodiments (see e.g. application Ser. No. 13/844,741), other elements may also drive the system, such as roller 160. In other embodiments discussed in the incorporated references, roller 160 is indicated as a drive roller; however, it may be noted that roller 160 may be either an idler roller or an active drive roller. For example, roller 160 may be connected to the same motor or the same drive mechanism associated with the sealer drum 166 that causes the drum to rotate. In other configurations, the sealing drum 166 may be passive (e.g. an idler) or actively driven by a motor. In one example, the sealing drum 166 may be passive and merely be rotated in response to the advancing web 100 or belt 162.

In accordance with various embodiments, the inflation and sealing device can have more than one belt. For example one belt may drive the various rollers and a second belt may pinch the web against the sealing drum. In various embodiments, the inflation and sealing device may have no belts. For example the sealing drum may pinch the web against a stationary platform and drive the web thorough the inflation and sealing device at the same time. Additional description and embodiments of such structures may be disclosed in U.S. Pat. Nos. 8,061,110 and 8,128,770 and Publication No. 2011/0172072 each of which is herein incorporated by reference.

Figure 10:
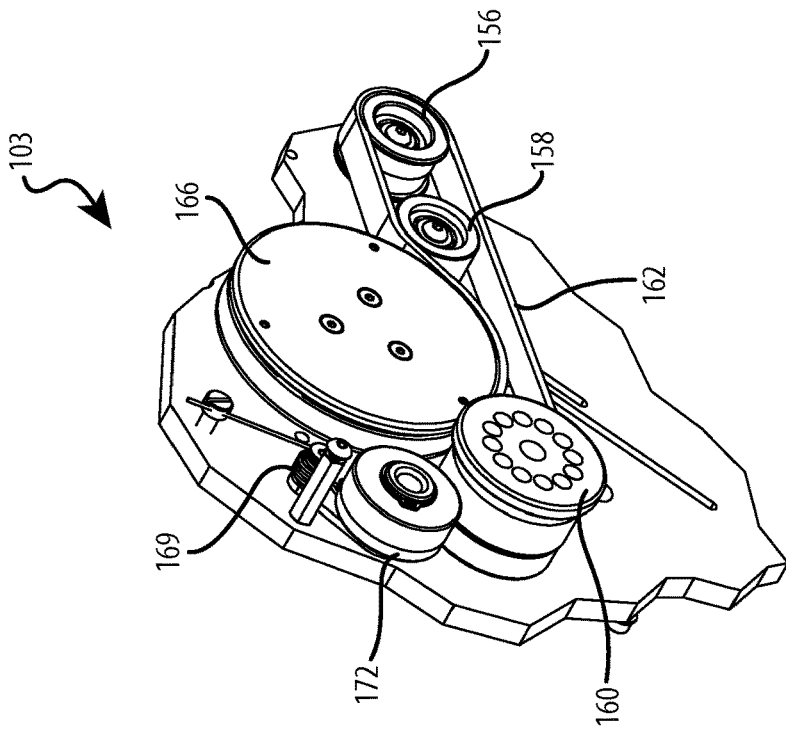
FIG. 10 is a front, right perspective view thereof.
Figure 9:
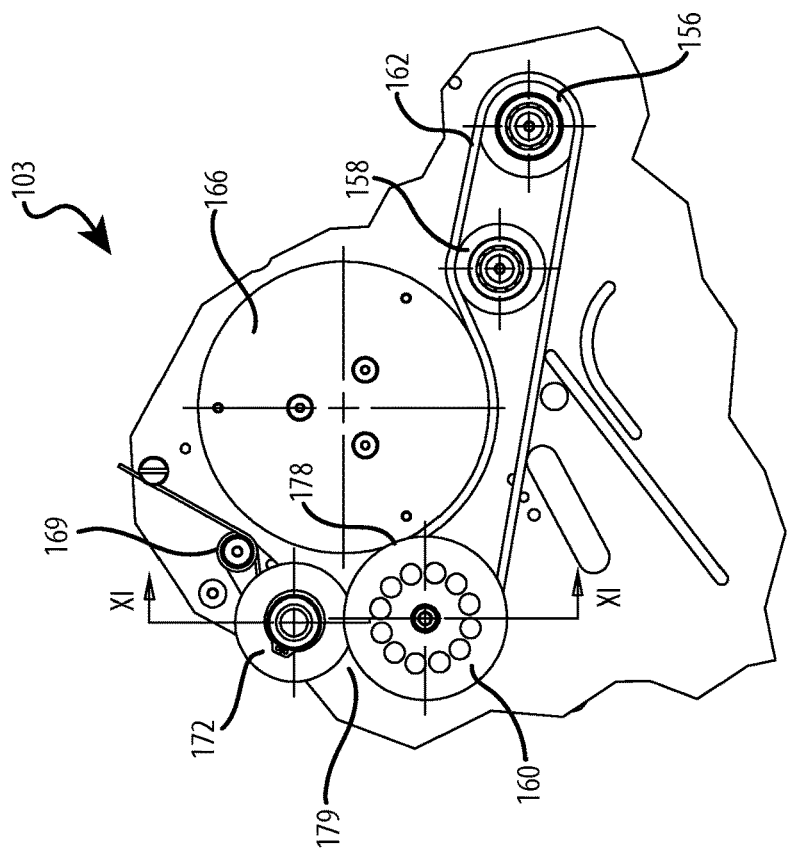
FIG. 9 is a right-side view of a sealing mechanism of the device of FIG. 2.
Figure 11:
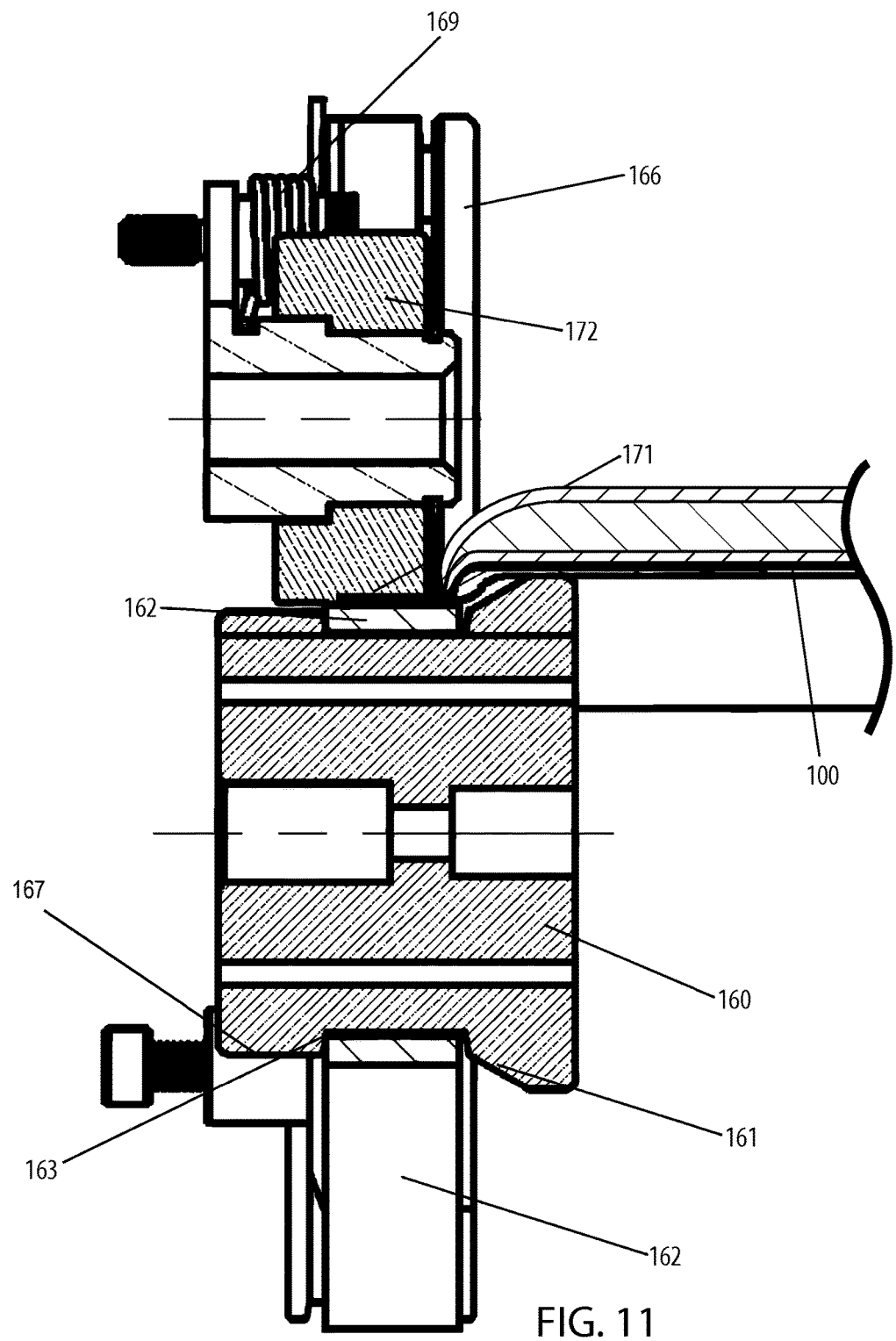
FIG. 11 is a front, cross-sectional view of post-sealing control elements taken along line XI-XI of FIG. 9.

Although some embodiments do not have a post-seal control element, the inflation and sealing assembly 103 shown in FIG. 2 includes a plurality of post-seal control elements. In various embodiments, the post-seal control element may be a movable or stationary surface, a roller, or any device that can contact the belt 162 or the web 100. For example, a post-seal control element can include roller 160 as discussed above. The roller 160 supports the web 100 exiting from the inflation and sealing assembly 103 and may be operable to guide the belt. As illustrated in FIGS. 9-11, the roller 172 may also be a post-seal control element. In various embodiments, there may be a single post-seal control element such as roller 160 as depicted in embodiments disclosed in the incorporated references (see e.g. Ser. No. 13/844,741). In other embodiments, there may be multiple post-seal control elements as illustrated in FIGS. 9-11. For example, a first post-seal control element (e.g. roller 172) can be disposed directly above a second post-seal control element (e.g. roller 160).

The two post-seal control elements (e.g. two rollers 160,172) pinch or press the web 100 so that the belt 162 abuts one or both of the surfaces of the elements. As the rollers 160,173 are disposed immediately downstream of the heating drum (or other heating mechanism in other embodiments), they provide a cooling region 179 disposed between two rollers 160,172. Roller 160 in this embodiment acts as a principle cooling roller, since the sealed and cooling film is drawn around this roller 160. Pinch roller 172 maintains the web in contact with the principle cooling roller 160 to help maintain the pressure between the two film layers as the seal cools to support the seal and surrounding area mechanically. In embodiments, such as the one shown, in which the belt 162 extends around roller 160, the outer surface of this roller remain substantially stationary with respect to the web 100, further helping support the seal in its delicate state before it has cooled sufficiently. Roller 160 is typically made of a hard and tough material, such as steel or aluminum, to withstand the pressures and heat from the belt 162, although a plastic or other material could be used in some embodiments.

In various embodiments, the post-seal control element such as roller 172 may have a larger-diameter area 171 opposing the belt than in adjacent parts of pinch roller 172. This annular ridge 171 allows contact against the web 100, while an adjacent smaller-diameter portion of roller 172 can remain out of contact therewith to help prevent sticking to the hot web. The roller 172 may be biased against the belt 162, web 100, and roller 160 by a spring-loaded tensioner 169. The tension provided by the tensioner 169 may further hold the seal closed by the post-seal control element, and can allow the pinch roller 172 to be lifted off the web when needed. To prevent or reduce sticking of the hot web 100 to the pinch roller 172, the pinch roller is preferably made of, or has a surface of, a non-stick or low adhesion material such as polytetrafluoroethylene (PTFE) or other suitable material. In accordance with various embodiments, the post-seal control element such as roller 160 may include a recessed annular surface 163. The recessed annular surface 163 may receive the belt 162.

When the web exits pinch area 178 between rollers 160 and 172 (these two rollers 160, 172 are at the exit of the sealing mechanism, such as the downstream exit from the device) there is a possibility that the hot film will stick to one of these rollers or belt (shown in FIG. 11) instead of cleanly exiting the device. In various embodiments, an element can be provided to help separate the film from the post-seal control elements. For example, roller 160 can have an annular ridge 161 extending proud the belt 162 or outer surface 167 of the roller 160 that supports the belt 162 against the, web 100, or that contacts the web 100. This ridge 161 can be annular or have another suitable shape and can run around the roller to contact the web 100, preferably transversely adjacent the longitudinal seal on the inflated web 100, such as against the transverse end of the inflated chambers 120 adjacent the longitudinal seal 112. At the pinch area 178, the annular ridge 161 contacts the web 100, typically against a transverse side of the inflated chambers 120 where due to the inflated shape, the chambers 120 have a degree of rigidity compared to the uninflated film. The elevated ridge provides a bump-off element that forcing the web 100 to deflect off the roller 160. The annular ridge 161 is a second surface that causes the web to bend. The bend may cause a portion of the web 100, located in the lateral direction relative to a first portion of the web 100 that is pressed between the first post-seal control element (e.g. roller 160) and the second post-seal control element (e.g. roller 172), to not stay in the same plane as the first portion of the web. Forcing different portions of web 100 into different planes may cause the web 100 to unseat, and often unstick, from the belt and/or the roller 160. As such, the annular ridge 161 aids in automatically peeling the web 100 off the post-seal control elements. While described with respect to a roller, alternative embodiments can have a stationary ridge provided adjacent the roller 160 to guide the web off the cylinder.

As the heated web 100 may have a tendency to stick to the post-seal control elements, non-stick materials may mitigate this issue. For example, one or both post-seal control elements may be made from of coated with polytetrafluoroethylene (PTFE), anodized aluminum, ceramic, silicone, or like non-stick/low-adhesion materials.

In the embodiment shown, the inflation and sealing device 101 further includes a cutting assembly 186 to cut the web off the inflation nozzle when an inflation channel that receives and is closed around a longitudinal inflation nozzle 140 is used. As with other system components discussed herein, the cutting assembly may also be structured, provided, or included in accordance with the various embodiments described by the incorporated references discussed above.

Control System and Recipes for the Inflation and Sealing Assembly

Figure 12:
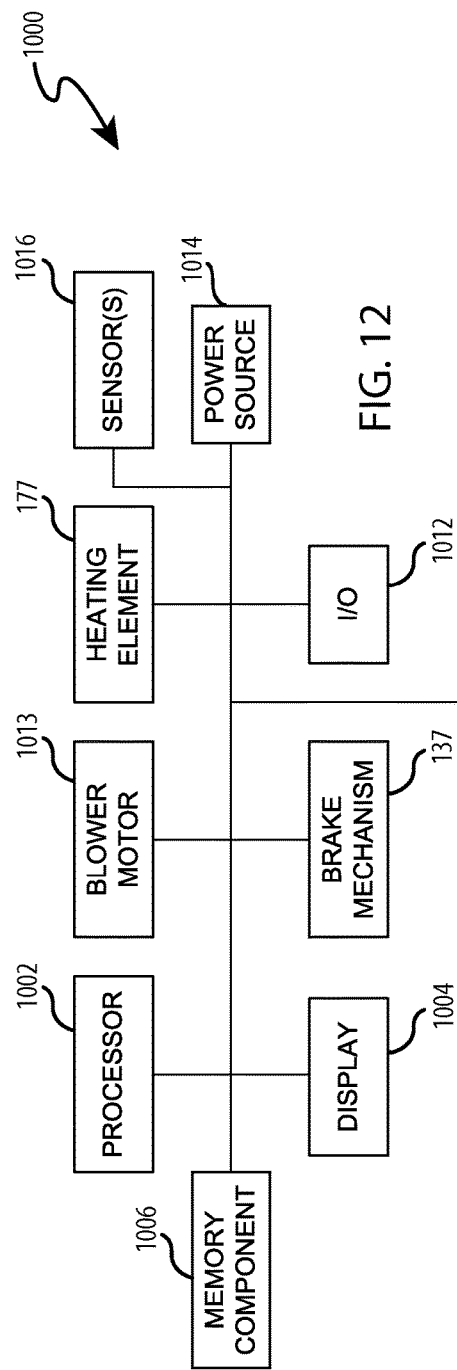
FIG. 12 is a simplified block diagram of a control system for the inflation and sealing assembly.

As explained above various inflation and sealing assembly (such as those discussed above or similar to those discussed above) may include a control system that can save or otherwise access recipes that automatically set parameters of the machine to create packaging material based on the uninflated materials loaded into the machine. With reference to FIG. 12, the control system 1000 of the inflation and sealing assembly will now be discussed in more detail. The control system 1000 may include one or more processing elements 1002, a display 1004, one or more memory components 1006, an input/output interface 1012, one or more sensors 1016, and a power source 1014. Each of the components of the control system 1000 may be in communication with other components via one or more system buses or other communication means. Additionally, the control system 1000 may include and/or be in communication with the blower motor 1013, drum motor 1001, the brake mechanism 137, the heating element 177, and other components of the inflation and sealing assembly that may be tracked and/or modified by the control system 1000.

The processor 1002 or processing element 1002 may control one or more functions and/or operations of the control system 1000 and/or inflation and sealing assembly. The processing element 1002 may be in communication, either directly or indirectly, with substantially all of the components of the control system 1000. The processing element 1002 may be any type electronic device capable of processing, receiving, and/or transmitting instructions. For example, the processing element 1002 may be a microprocessor or a microcomputer. As described herein, the terms "processor" and "processor element" are meant to encompass a single processor or processing unit, multiple processors, or multiple processing units, or other suitably configured computing element.

The memory component 1006 may include one or more storage or memory components that store electronic data that may be utilized by the control system 1000 and/or inflation and sealing assembly. For example, the memory 1006 can store electrical data or content, e.g., recipes or settings for the inflation and sealing assembly for select materials, document files, audio files, and so on. The memory 1006 may be, for example, magneto-optical storage medium, read only medium, random access memory, erasable programmable memory, or flash memory.

The input/output interface 1012 receives and transmits data and provides connection to one or more components. For example, the input/output interface 1012 may receive user input through one or more input devices (e.g., keyboard, mouse, touch screen, or the like), and may transmit data between the control system 1000 and other electronic devices (e.g., computers, other control systems, or the like). Additionally, the input/output interface 1012 may facilitate output to one or more output devices, such as the display 1004, speakers, headphones, or the like. The input/output interface 1012 may transmit and receive data in a various manners across one or more networks (e.g., WiFi, Ethernet, Bluetooth), cellular networks, and so on. The type of communication network may depend on a variety of different requirements, design parameters, and so on, and as such the input/output interface 1012 may be modified as desired.

The power source 1014 may be substantially any device capable of providing energy to the various components of the inflation and sealing assembly as well as the control system 1000. For example, the power source 1014 may be a connection cable configured to connect the assembly to another power source, such as a wall outlet, and/or the power source 1014 may be a battery or other portable energy storage component.

The display 1004 provides a visual output for the control system 1000. In many embodiments the display 1004 may be used to provide output to a user by displaying data, images, video, or the like. Additionally, the display 1004 may cooperate with the input/output interface 1012 to receive data input. For example, the display 1004 may include one or more touch sensors that receive inputs from a user (e.g., capacitive or resistive touch screen). The display 1004 may be substantially any type of visual output device, such as, but not limited to, liquid crystal display (LCD), light emitting diode (LED) display, plasma display, or the like. The type and size of the display 1004 may depend on the type of inflation and sealing assembly as well as the control system 1000.

The one or more sensors 1016 are sensing elements that can sense changes in one or more characteristics or parameters. For example, the sensors 1016 may include a temperature sensor, an image sensor (e.g., camera), a speed or motion sensor, rotation sensor, accelerometer, gyroscope, or the like. The sensors 1016 are configured to detect information corresponding to one or more components of the inflation and sealing assembly, information about the material loaded onto the spindle 136 of the inflation and sealing assembly (e.g., one or more of the material characteristics), and/or data about other assemblies or control system 1000. Accordingly, the sensors 1016 may be positioned at various locations of the inflation and sealing providing the sensors 1016 with sufficient access to or communication with the monitored component to detect its settings and/or operating parameters. As an example, the heating element 177 may include a temperature sensor operably connected thereto where the temperature sensor can detect the current temperature of the heating element.

In embodiments including sensors 1016 to detect information about the material used with the inflation and sealing assembly, the sensors 1016 may be used to analyze the material itself, one or more identifiers on the material, and/or the like. For example, the sensors 1016 may include a barcode scanner that can read a barcode imprinted on the material or packaging of the material. As another example, the sensors 1016 may include a RFID receiver/transmitter that receives data corresponding to a RFID tag or other identifier. As yet another example, the sensors 1016 may include a material sensor that can determine the type, width, thickness, or the other features of the material to be used with the inflation and sealing assembly. The types of sensors 1016, as well as their locations, may be modified as desired and based on the type of assembly, control system 1000, and/or material.

Figure 14:
FIG. 14 is an elevation view of a roll of material for use with the inflation and sealing assembly including an identifier with the identifier being sensed by a sensor of the control system.

The sensors 1016 may be configured to read data corresponding to the material and/or machine parameters directly from the material. FIG. 14 is a diagram illustrating a roll of material 1009 including an identifier 1010. With reference to FIG. 14, the sensor 1016 is positioned to be in communication (e.g., optical and/or electrical) with the material roll 1009. This allows the control system 1000 to determine the type of material, the amount of material left on the roll, one or more recipes associated with the material, or one or more machine parameters for the material, by sensing the identifier 1010 using the sensor 1016. As a first example, the sensor 1016 may be a RFID reader and the identifier 1010 may be a RFID tag. As a second example, sensor 1016 may be a barcode reader or quick response (QR) code reader and the identifier 1010 may be a barcode or QR code. As a third example, the identifier 1010 may be a printed or text recipe including a listing of machine parameters (e.g., sealing temperature, inflation characteristics, etc.) and the sensor 1016 may be a camera that captures the recipe and using a text recognizer function to input the recipe into the control system 1000.

Figure 13:
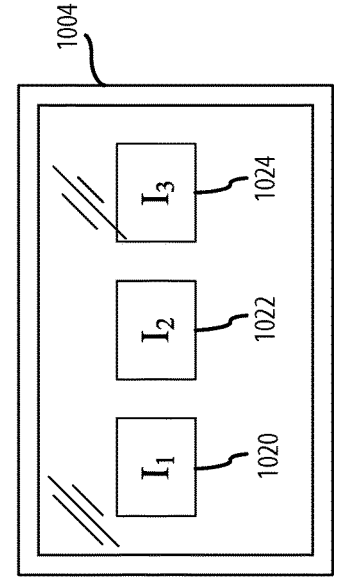
FIG. 13 is a diagram of a display of the control system displaying icons corresponding to one or more recipes for processing different supply material configurations.

An example of using the display 1004 to receive input to the control system 1000 will now be discussed. FIG. 13 is a front elevation view of an illustrative display for the control system. With reference to FIG. 13, the display 1004 includes an output of one or more icons 1020, 1022, 1024. Each of the icons 1020, 1022, 1024 may correspond to a material, such as an arbitrary name of the material (e.g., trade name), a material type or characteristics (e.g., 10 mm, polyethylene), a recipe name (which may be set to be similar to the trade name or name of the material) or other material identifier. The control system 1000 may receive a user input indicating the type of material that is loaded onto the inflation and sealing assembly or a material that is to be used with the inflation and sealing assembly. As one example, the user may select one of the icons 1020, 1022, 1024 corresponding to the material that is to be used by using his or her finger or by using an input device (e.g., stylus, capacitive touch screen, mouse, keyboard, etc.). As another example, the user may directly input the recipe name into the control system. In some embodiments, the control system 1000 may require a password, user identification, or other security feature before a recipe can be selected or before any parameters can be manually or automatically adjusted. In some embodiments, the icons and/or the recipe names may correspond to the material or the material characteristics, e.g., the recipe name may be similar to the trade name of the material or the recipe may In this example, the processor 1002 may access recipes stored in the memory component 1006 corresponding to each of the available materials. In other words, the memory component 1006 may store parameter settings for each of the components for the inflation and sealing assembly that are to be used when the select material is being inflated and sealed with the assembly. In this manner, the control system 1000 can automatically adjust the inflation and sealing assembly based on the material. FIGS. 1A-1D illustrate top plan views of examples of materials including different inflating configurations. Each of the materials 1040, 1042, 1044, 1046 include varying sealed locations where two layers of the film for each of the materials are connected together. The location, size, geometry, and the like of the sealed locations defines the pillow pattern when the material 1040, 1042, 1044, 1046 is inflated by the inflation and sealing assembly. The patterns shown in FIGS. 1A-1D are meant as exemplary only and many other patterns may be used.

The control system 1000 is configured to automatically adjust components of the inflation and sealing assembly, as well as provide output to a user indicating which components should be adjusted. In some embodiments, the control system 1000 is able to adjust the settings of certain components that are not typically adjustable in conventional inflation and sealing machines. For example, the control system 1000 can adjust one or more parameters corresponding to the brake mechanism 137 (specifically the motor 220) of the spindle 136, which allows the tension applied to the roll of material to be adjusted. Additionally, the control system 1000 can adjust the ramp up and down profiles for a plurality of motors of the inflation and sealing assembly, which allows the motors and various components to be customized to the recipe of the material being processed, as well as to the operating conditions of the inflation and sealing mechanism.

Figure 15:
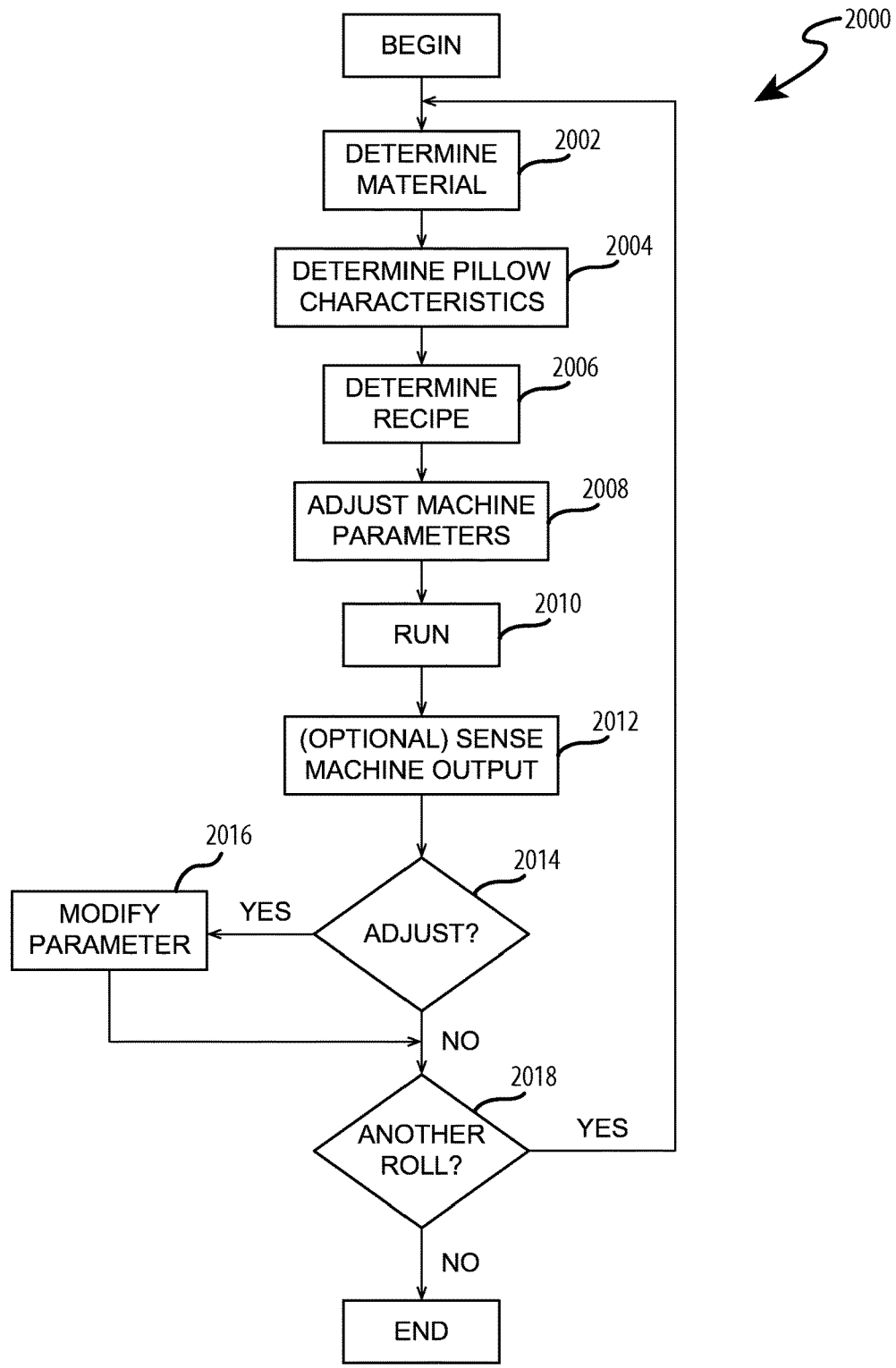
FIG. 15 is a flow chart illustrating a method for modifying one or more machine parameters based on one or more material parameters.

A method of operating the inflation and sealing assembly will now be discussed in further detail. FIG. 15 is a flow chart illustrating a method of operating the inflation and sealing assembly. With reference to FIG. 15, the method 2000 may begin with operation 2002 and the control system 1000 may determine the type of material loaded onto the spindle 136. In some embodiments, one of the sensors 1016 of the control system 1000 may sense or receive data from the material to determine the type of material. In a first example, the sensor 1016 may scan a barcode embedded, attached, or otherwise connected to the roll of material, and the processor 1002 may analyze the barcode to determine the type of material and optionally the settings of one or more components of the inflation and sealing assembly. In a second example, the sensor 1016 may include a RFID receiver and may receive a REND identifier attached to the roll of material or packaging and the processor 1002 may use the RFID identifier to determine information about the material. In a third example, the sensor 1016 may be a camera and capture an image of the material and/or the material label (e.g., packaging) and the processor 1002 will analyze the picture to determine the material. In a fourth example, the control system 1000 may receive input from a user. In this example, the user may directly input the material data into the control system 1002 via the input/output interface 1012, e.g., via a keyboard, mouse selecting an icon, or the like. In a fifth example, the control system 1000 may receive material data from another computing device such as through a network, server, or the like. The above list of examples is not meant as exhaustive, but merely illustrative. Many other embodiments are envisioned.

Once the material has been determined, the method 2000 may proceed to operation 2004. In operation 2004 one or more parameters of the inflatable cushions or pillows may be determined. For example, the material may have a predetermined inflation design where select areas of the material are sealed together or open to define inflatable pockets that expand when filled with air. In some examples, the pillow parameters may be predetermined based on the type of material, i.e., the pillow parameters may be encompassed within a description of the material loaded onto the spindle 136. After the pillow parameters have been determined, which may be encompassed with operation 2002, the method 2000 may proceed to operation 2006.

In operation 2006 the control system 1000 determines a recipe for using the inflation and sealing assembly to create the packaging material using the raw material on the spindle 136. The control system 1000 uses the material information and/or pillow parameters from operations 2002, 2004, respectively, to adjust or modify one or more components on the inflation and sealing assembly. For example, the processor 1002 may pull a recipe for the select material on the spindle 136 from the memory component 1006 once the material or other identifier has been determined. In some embodiments, the recipe may be directly input to the control system 1000, such as through the input/output interface, through the display 1004 (e.g., a user selecting an icon corresponding to the material), or the recipe may be tagged or otherwise connected to the material 1009 itself (e.g., embedded as a code, text, or the like).

The recipe includes data such as the speed of one or more motors (e.g., blower motor, drum motor, brake mechanism motor), the temperature of the heating element 177, the air speed or other settings of the blower 1013, inflation rate, ramp up speed for the motors, heater ramp up temperature and profile, the initial tension setting for the brake mechanism 137, a tension setting at a "stop" position for the brake mechanism 137, fill height of the pillows, a blower start up temperature of the blower 1013 at start up, an initial temperature for the sealing drum 166/heating element 177, a motor stop delay time, ramp up/down profiles for one or more components (e.g., sealing drum 166, blower 1013, brake mechanism 137, etc.), spacing chambers for the materials, fill volume, width and/or length of the material, coatings present on the material (e.g., blocking prevention coatings). In other words, the recipe includes settings or operating profiles for a plurality of components for the inflation and sealing assembly. Additionally, the recipe data may include parameters for start-up, normal operating, and stopping. For example, the parameters of each component may need to be varied based on the components warm up time, operating parameters and slow down time. The number of components adjusted may be varied based on the material, the type of inflation and sealing assembly, operation speed, operation temperature, and so on. As such the components adjusted listed herein are meant as illustrative only.

In another embodiment, the processor 1002 may analyze the material and pillow parameters to determine the recipe. In other words, using data about the material and the pillow parameters the processor 1002 may create the recipe either in real time or substantially in real time. For example, the processor 1002 may determine certain characteristics or settings based on the material information, i.e., the material has a thickness of X inches and therefor will set the temperature in the heating and sealing element that will heat through the thickness. In yet another embodiment, the processor 1002 may pull the recipe from the memory component 1006, a network, server, material manufacture's website, or substantially any other computing device. That is, the recipe may be stored within and/or accessed by the control system 1000.

To assist in understanding the present disclosure, the following examples are included to illustrate example recipes that can be used by the control system 1000. The examples described herein should not, of course, be construed as specifically limiting the disclosure and such variations of the disclosure, now known or later developed, which would be within the purview of one skilled in the art are considered to fall within the scope of the disclosure as described herein and hereinafter claimed.

In the recipes below the names used refer to the following parameters. DESC is the material identification (e.g., trade name or description). SPEED is the speed setting for the sealing drum 166 from 1-100 (e.g., a speed of 75 is 75% of the top speed). BLWER is the blower or air setting as a percentage of maximum air flow. TEMP is the temperature of the heating element or other seal setting in the recipes in Fahrenheit. BRAKE_START is the steady state tension setting for the brake mechanism and is a percentage of the total braking force or torque. As described above, in some instances the braking mechanism 137 may include a motor 220 that rotates in the opposite direction from the drum motor. In these examples, the braking force may be a percentage of motor power (e.g., 1-100%) that is applied to the braking mechanism 137 (specifically the motor 220). In examples where the braking mechanism is a frictional element, the braking force may be determined as a position (farthest to closest) to the roll of material or by another characteristics. BRAKE_END is the braking tension of the braking mechanism during "stop," and similarly to BRAKE_START may be a percentage of the motor speed or another braking characteristic depending on the type of braking mechanism used. BSTRT is the blower start up temperature in Fahrenheit. MSTRT is the motor start up temperature in Fahrenheit. MSTOP is the motor stop delay in milliseconds.

MUP is the motor ramp up profile, MDOWN is the motor ramp down profile, BUP is the blower ramp up profile, BDOWN is the blower ramp down profile, and BKEND is the brake mechanism ramp up profile at stop. The ramp up and ramp down profiles are profiles of the various components of the inflation and sealing assembly as it turns on and as it turns off. For example, when a motor is first activated it may need to rotate its drive shaft at a lower speed for a select period of time before the speed can be increased to maximum or near maximum to avoid damaging the machine or the other components positioned or connected to the machine. This is because some motors may have different rotational parameters as they are powered up as compared to when they have been running for a select period of time. By using a ramp up time the control system can gradually increase the power to the motor to full speed. Similarly, the motors may be damaged if they suddenly stop rotating after they have been rotating at full speed (or close to full speed). Accordingly, some of the recipes may include a ramp down profile that slowly decreases the power provided to the motor to gradually reduce the speed until the motor can be safely stopped completely. The ramp up and ramp down times and speeds may be determined based not only on the mechanical components, but also the material and recipe properties. For example, if the maximum speed desired for a particular material is slower than a typical operating speed, the ramp up time for the motor may be increased. As another example, the weight of the material roll may impact the ramp up and/or ramp down profile, e.g., a heavier material may require a longer and slower ramp up process as compared to a lighter material.

In the recipes below the ramp up and ramp down profiles are listed as a function of time and the motor speed percentage. For example with reference to the first example recipe and MUP, at time 0 the motor speed is 0% of max, at 1300 ms the motor speed is 50% of max, at 2000 ms the motor speed is 80% of max, at 2800 ms the motor speed is 95% of max, and at 3200 ms the motor speed is 100%. In this example the motor ramp up profile takes about 3200 ms for the motor to reach full speed. With reference to the MDOWN or motor ramp down profile in this recipe the profile takes only 301 ms to ramp down, i.e., the motor ramp down profile is much faster than the motor ramp up profile. By changing the ramp up and ramp down profiles of the inflation and sealing assembly components based on the material being inflated and sealed, the assembly may operate safer and may have a reduced chance of damage to components, such as the motors, as they may be adequately ramped up/down before reaching maximum speed and stopped positions.

It should be noted that the above units and parameters are illustrative only and may be varied based on the type of machine, materials, and so on. For example, in the recipe examples provided below a plurality of the settings are selected as a percentage of the maximum level for the select component. However, in other examples, the settings may be selected as an absolute value (the temperature settings in the recipe examples are set as these values). Alternatively or additionally the recipes may include ranges of the settings, e.g., 50-60% of maximum speed and the control system 1000 may select the appropriate setting based on the current operating conditions.

Figure 1D:
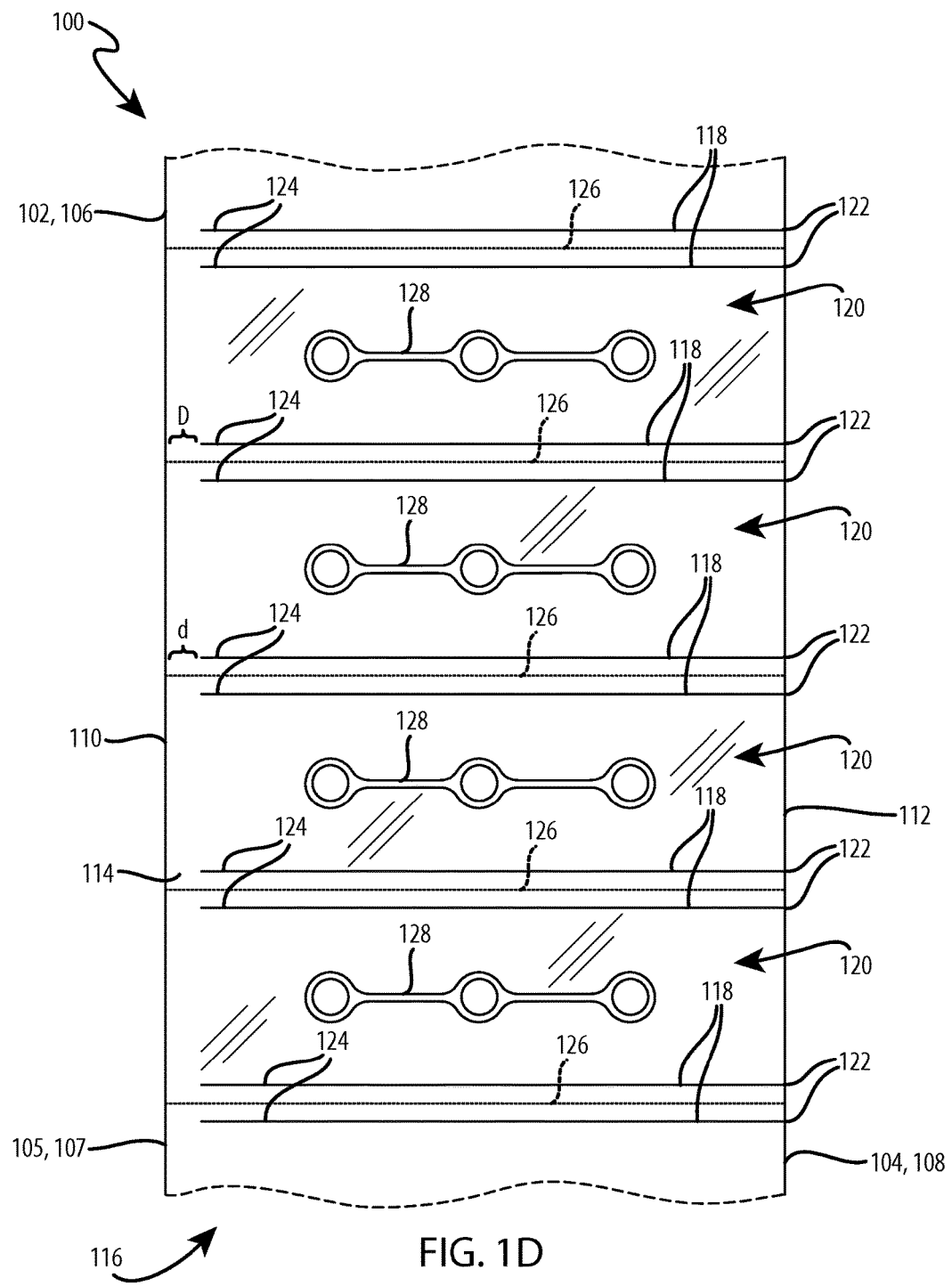

A first example of a recipe that may be used to inflate and seal material 1046 illustrated in FIG. 1D is provided below.
    DESC=Material 1
    SPEED=85
    BLWER=55
    TEMP=320
    BRAKE_START=5
    BRAKE_END=100
    BSTRT=295
    MSTRT=290
    MSTOP=400
    MUP=0, 0, 1300, 50, 2000, 80, 2800, 95, 3200, 100,
    MDOWN=0, 100, 100, 50, 200, 25, 300, 0, 301, 0,
    BUP=0, 0, 500, 50, 1850, 70, 3500, 100, 3600, 100,
    BDOWN=0, 100, 5, 50, 25, 0, 26, 0, 27, 0,
    BKEND=0, 0, 250, 60, 300, 75, 360, 100, 600, 0, A second recipe example is provided below. This recipe may be used to inflate and seal material 1042 shown in FIG. 1B.
    DESC=Material 3
    SPEED=65
    BLWER=100
    TEMP=330
    BRAKE_START=15
    BRAKE_END=90
    BSTRT=300
    MSTRT=320
    MSTOP=400
    MUP=0, 0, 2000, 70, 2500, 95, 2700, 100, 2800, 100,
    MDOWN=0, 100, 150, 90, 250, 75, 300, 40, 500, 0,
    BUP=0, 0, 1500, 80, 2000, 95, 2200, 100, 2300, 100,
    BDOWN=0, 100, 5, 50, 25, 0, 26, 0, 27, 0,
    BKEND=0, 0, 300, 50, 375, 80, 425, 100, 600, 0, Using a stored recipe or otherwise accessing a recipe the control system 1000 can determine the settings for one or more components of the inflation and sealing assembly. With reference against to FIG. 15, in operation 2006, the control system 1000 may not only determine the typical recipe for the material and pillow parameters, but may also adjust the recipe based on the parameters of the inflation and sealing assembly. For example, if the recipe specifies a first temperature for the heating element 177, but the sealing drum 166 is running slower than typical, the control system 1000 may adjust the temperature to compensate for the slower speed. As another example, the braking friction applied by the braking mechanism 137 (specifically the motor 220) may be may be set to a first level but if the roll of material has a larger or smaller diameter than typical or larger than the diameter used to create the recipe, the control system 1000 may dynamically adjust the braking friction to compensate for this change. Other changes to parameters of the inflation and sealing assembly based on changes to one or more parameters based on interrelated functionality will be discussed in more detail below with respect to 15.

It should be noted that in some embodiments, the inflation and sealing assembly may not identify any material parameters or pillow characteristics. In these embodiments, the control system 1000 may determine the recipe by using the identifier 1010 on the material 1009 itself or the recipe may be accessed by using a lookup table or other resource based on an arbitrary material name (e.g., trade name) or the like. In these embodiments, the control system 1000 may access the recipe as it is stored in memory, over a network, or the like without having to determine any of the parameters of the material itself.

With continued reference to FIG. 15, once the recipe has been determined or otherwise accessed, the method 2000 may proceed to operation 2008. In operation 2008 the various components of the inflation and sealing assembly are adjusted based on the recipe. In other words, the components are set at the desired settings based on the data of the recipe. In one embodiment, each of the components may be adjusted by the control system 1000 automatically. However, in other embodiments, select components may need to be adjusted by a user. In these embodiments, the display 1004 or other output element provides output to a user to other computing device to indicate the parameters that need to be manually modified. For example, the display 1004 may display a picture or icon of the component with an indication of the setting that needs to be adjusted.

In embodiments where the components of the inflation and sealing assembly can be adjusted by the control system 1000, the control system 1000 will provide instructions for the various components regarding the setting and can then confirm that the components are set at the desired levels.

After operation 2008, the method 2000 may proceed to operation 2010. In operation 2010 the inflation and sealing assembly is activated and operates. In particular, the assembly begins to run and the material is fed from the spindle through the assembly to create the packaging material. While the inflation and sealing assembly is operating, the method 2000 may proceed to optional operation 2012. In operation 2012 the control system 1000 may receive feedback regarding the functionality of the inflation and sealing assembly and/or various components of the inflation and sealing assembly. For example, one or more sensors may detect the real time functioning of the machine or components, such as the temperature of the heat/sealing element, the speed of the motor, the braking resistance being applied, and so on. This operation 2012 allows the control system 1000 to receive real time or substantially real time feedback regarding the assembly.

After operation 2012, the method 2000 may proceed to operation 2014. In operation 2014 the control system 1000 determines whether any components or parameters of the inflation and sealing assembly should be adjusted. For example, using feedback from operation 2012 (e.g., sensor readings while the machine is operating), the control system 1000 may determine that one or more components need to be adjusted. This feature allows the control system 1000 to dynamically adjust the inflation and sealing assembly during operation.

If in operation 2014 one or more components should be adjusted, the method 2000 proceeds to operation 2016. In operation 2016, the control system 1000 modifies the parameter or component. Operation 2016 may be substantially similar to operation 2008, but may be adjusted based not only on the recipe and material, but also on the real time operation of the sealing and inflation machine itself. For example, if the select component is not running as programmed to do or based on the operation of other components of the machine, the select component may be modified accordingly. As a specific example, the motor is not operating at the programmed speed, such as due to a malfunction or error, the heating element may be turned down to account for the slower speed.

If in operation 2014 components did not need to be adjusted or after operation 2016 and the components have been adjusted, the method 2000 may proceed to operation 2018. In operation 2018 the control system 1000 determines whether another roll of material is to be loaded onto the inflation and sealing assembly. If another roll is to be loaded, the method 2000 returns to operation 2002. However, if another roll is not to be loaded, the method 2000 proceeds to an end state.

Using the method 2000 and the control system 1000, the inflation and sealing assembly can adjust the parameters of the assembly to account not only for the material to be inflated and sealed, but also on the operating conditions of the assembly itself. This allows the inflation and sealing assembly to more quickly create packaging material, as well as help to avoid errors or other issues that could arise due to malfunctions in the machines or deviations from expected performance of the various components of the inflation and sealing assembly.

In some embodiments the control system 1000 may set and/or adjust one or more parameters based on the interdependencies or correlations between two or more parameters. For example, in some instances modifying a first parameter can affect a second parameter and the inflation and sealing assembly may not function as desired if the second parameter is not also adjusted. Parameters may be related by a 1:1 relationship, e.g., as one increases the other should be increased by the same amount, by a percentage relationship, e.g., as one parameter increases by 20% the second parameter should increase by 5%, by an inverse relationship, e.g., as one parameter increases the other decreases, and so on. The related parameters and their relationships may be varied based on the geometry and configuration of the inflation and sealing assembly, the type of material, the operating speed, operating environment, and other characteristics. As such, the parameters and relationships listed herein are meant as illustrative only and may change.

Figure 16:
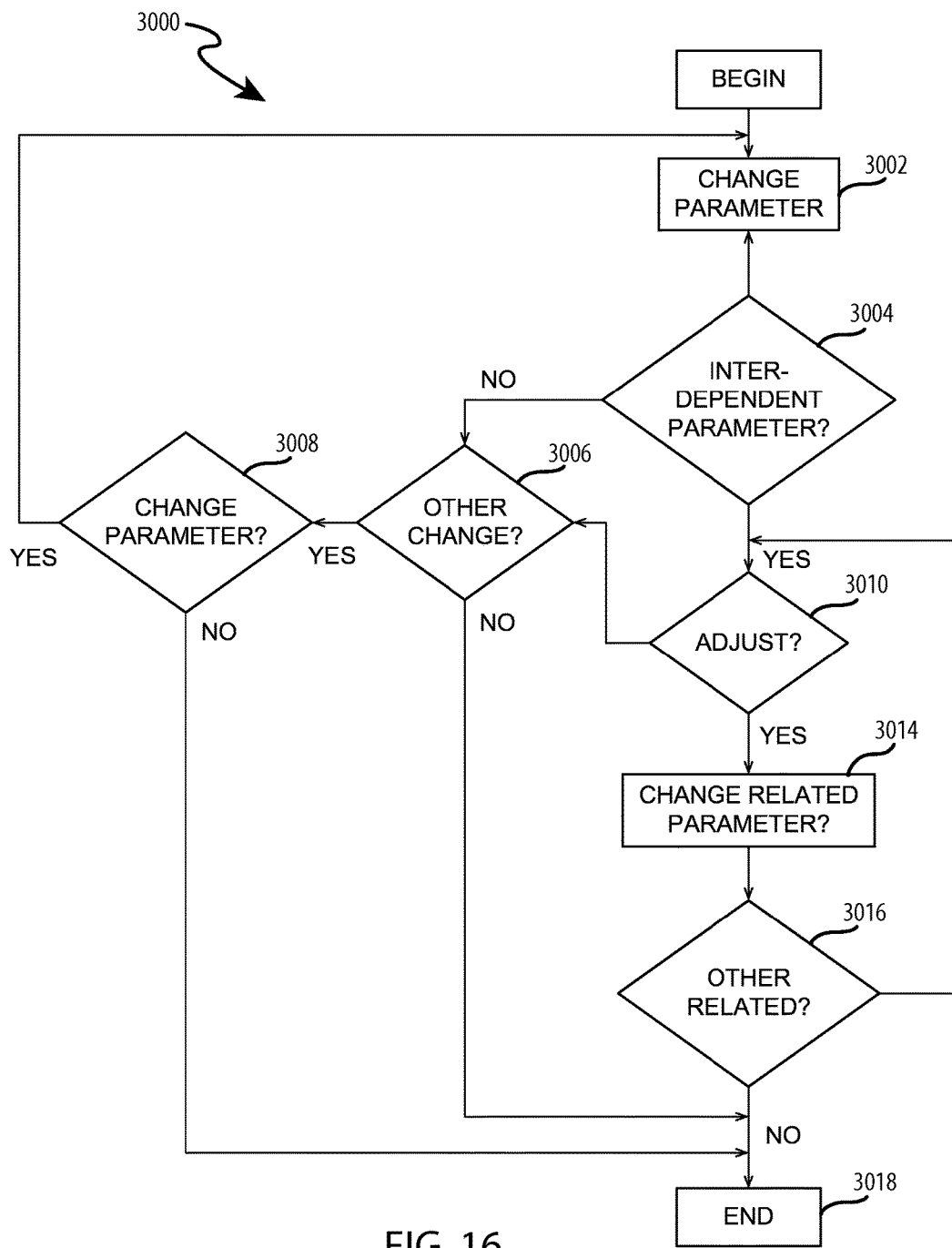
FIG. 16 is a flow chart illustrating a method for modifying one or more machine parameters based on modification of one machine parameter.

A method for varying one or more parameters based on changes to one or more other parameters will now be discussed in more detail. FIG. 16 is a flow chart illustrating a method for adjusting parameters of the inflation and sealing assembly. With reference to FIG. 16, the method 3000 may begin with operation 3002. In operation 3002 a first parameter is changed on the inflation and sealing assembly. The parameter may be changed due to the input of a recipe based on a material being loaded onto the assembly, may be changed by a user, or may be otherwise varied. The parameter may be changed automatically or manually. Once the parameter has changed, the method 3000 may proceed to operation 3004. In operation 3004, the control system 1000 determines whether there is an interdependent parameter. In other words, the control system 1000 analyzes whether there is another parameter functionally related to the changed parameter. In this manner the controls system 1000 determines whether there is any relationship between the changed parameter and other parameters of the inflation and sealing assembly.

If in operation 3004 there is a related parameter the method 3000 may proceed to operation 3010. In operation 3010 the control system 1000 evaluates the related parameter to determine if it should also be adjusted. For example, the control system 1000 may analyze the amount of change to the first parameter to determine whether the range is sufficient to warrant a change to the second parameter. In this example, certain adjustments to the first parameter may be sufficiently small that the second parameter may not need to be adjusted, although it is functionally related to the first parameter.

If in operation 3010 the second parameter should be adjusted, the method 3000 may proceed to operation 3014. In operation 3014 the related parameter is adjusted. In some embodiments, the control system 1000 may automatically change the related parameter. As one example, the control system 1000 can vary a signal provided to a component that will change the parameter, such as the speed of the motor or the temperature of the heating element. In other embodiments, the control system 1000 may provide output to indicate to a user that the parameter needs to be adjusted. As an example, the control system 1000 may cause an alert to be displayed on the display 1004. The alert may indicate the parameter to be changed and the change amount or new setting. In these embodiments, the parameter may be adjusted manually by a user.

After the related parameter has been changed, the method 3000 may proceed to operation 3016. In operation 3016 the control system 1000 determines whether there are any other related parameters. For example, often one parameter may be functionally related to two or more parameters and thus as one parameter is changed multiple other parameters may also need to be changed. As another example, a first parameter may be related to a second parameter and the second parameter may be related to a third parameter. In this example, as the second parameter is adjusted based on the modifications to the first parameter, the third parameter may also need to be adjusted. If there are other related parameters the method 3000 may return to operation 3010. However, if there are no other related parameters, the method 3000 may proceed to an end state 3018.

With continued reference to FIG. 16, if in operation 3004 there are no related parameters or if in operation 3010 the related parameters are not to be adjusted, the method 3000 may proceed to operation 3006. In operation 3006 the control system 1000 may determine whether there are other changes to the system that should be evaluated. For example, if one or more parameters or components is not operating as desired, if the material changes, and/or if the operating environment changes, the control system 1000 want to reevaluate whether other parameters should be changed.

If there have been other changes to the system, the method 3000 may proceed to operation 3008. In operation 3008 the control system 1000 determines whether any parameters should be modified based on these changes. If so, the method 3000 returns to operation 3002. However, if the parameter does not need to be changed despite changes to the system or if in operation 3006 there have not been other changes to the system, the method 300 proceeds to the end state 3018.

Using the method 3000 the inflation and sealing assembly can dynamically adjust to conditions during operation, as well as adjust parameters to compensate for adjustment in other parameters. For example, in some embodiments the inflation and sealing assembly may implement recipes that are stored either in the memory component 1006, other computing device, or identified by the material itself (e.g., via the identifier 1010) and the recipes may include settings for certain components but may not include settings for others. Using the method 3000 the control system 1000 can determine the changes to all parameters, even if those parameters are not directly part of the recipe.

Any and all references specifically identified in the specification of the present application are expressly incorporated herein in their entirety by reference thereto. The term "about," as used herein, should generally be understood to refer to both the corresponding number and a range of numbers. Moreover, all numerical ranges herein should be understood to include each whole integer within the range. The content of U.S. patent application Ser. No. 13/844,741 is hereby incorporated by reference in its entirety.

While illustrative embodiments of the invention are disclosed herein, it will be appreciated that numerous modifications and other embodiments may be devised by those skilled in the art. For example, the features for the various embodiments can be used in other embodiments. Therefore, it will be understood that the appended claims are intended to cover all such modifications and embodiments that come within the spirit and scope of the present invention.

What is claimed is:

1. A method for modifying one or more parameters of a film inflation and sealing machine by a control system that includes a controller and a memory component and that is configured to control operating parameters of the film inflation and sealing machine, the method comprising:
   providing a film inflation and sealing machine in communication with the control system, wherein the memory component of the control system stores a plurality of prestored recipes, wherein each of the plurality of prestored recipes includes settings for a plurality of operating parameters of the film inflation and sealing machine, and wherein different ones of the plurality of prestored recipes correspond to different supply material configurations;
   providing a supply of film material of a first supply material configuration to the inflation and sealing machine;
   selecting, by the controller, a first one of the prestored recipes corresponding to the first supply material configuration from the plurality of prestored recipes stored in the memory component; and
   modifying, by the controller, one or more settings for corresponding one or more operating parameters of the film inflation and sealing machine according to the first prestored recipe.

2. The method of claim 1, wherein the supply material configuration of a supply of film material comprises one or more characteristics of the supply of film material.

3. The method of claim 2, wherein the one or more characteristics include thickness of the supply of film material.

4. The method of claim 2, wherein the method further comprises identifying the first supply material configuration at least in part by detecting the one or more characteristics of the supply of film material by a sensor.

5. The method of claim 1, wherein the one or more operating parameters include first and second parameters, the method comprising:
- modifying the first parameter in accordance with the first prestored recipe;
- analyzing the second parameter to determine if the second parameter is functionally related to the first parameter;
- if the second parameter is functionally related to the first parameter, adjusting the second parameter based on the modification to the first parameter; and
- if the second parameter is not functionally related to the first parameter, not adjusting the second parameter.

6. The method of claim 5, wherein, if the second parameter is functionally related to the first parameter further comprising analyzing a first modification to the first parameter to determine a second modification to the second parameter, wherein the second modification is related to the first modification by a predetermined function.

7. The method of claim 5, wherein the first parameter is an operational parameter of a drum motor and the second parameter is an operational parameter of a brake mechanism.

8. The method of claim 1, further comprising determining a ramp up profile for at least one component of the film inflation and sealing machine based on the one or more operating parameters corresponding to the one or more settings.

9. The method of claim 8, wherein the at least one component is at least one of a drum motor or a braking mechanism.

10. The method of claim 1 further comprising identifying, by the controller, the first supply material configuration.

11. The method of claim 10, wherein the identifying the first supply material configuration comprises detecting by a sensor, material data connected to or embedded within the supply of film material, the material data being indicative of the supply material configuration of the supply of film material.

12. The method of claim 10, wherein the identifying the first supply material configuration comprises:
- displaying a plurality of icons on a display, each icon of the plurality of icons corresponding to one or more materials; and
- receiving a user input identifying a first icon of the plurality of icons, wherein the selecting the first prestored recipe comprises selecting a prestored recipe from the plurality of prestored recipes that corresponds to the first icon.

13. The method of claim 10, wherein:
- the identifying the first supply material configuration comprises receiving a material input corresponding to a first material; and
- the selecting the first prestored recipe comprises retrieving from the memory component, a prestored recipe from the plurality of prestored recipes that corresponds to the first material.

14. The method of claim 1, wherein the modifying one or more settings for corresponding one or more operating parameters of the film inflation and sealing machine comprises selectively varying, responsive to command from the controller and based on the first prestored recipe, a frictional force applied by a brake mechanism to a spindle of the film inflation and sealing machine that supports the supply of film material.

* * * * *